(12) United States Patent
Watanabe et al.

(10) Patent No.: US 8,092,890 B2
(45) Date of Patent: *Jan. 10, 2012

(54) OPTICAL INFORMATION RECORDING MEDIUM, METHOD OF RECORDING INFORMATION, AND AZO METAL COMPLEX DYE

(75) Inventors: Kousuke Watanabe, Kanagawa (JP);
Tetsuya Watanabe, Kanagawa (JP);
Taro Hashizume, Kanagawa (JP);
Masashi Ogiyama, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 838 days.

This patent is subject to a terminal disclaimer.

(21) Appl. No.: 12/101,360

(22) Filed: Apr. 11, 2008

(65) Prior Publication Data

US 2008/0254252 A1 Oct. 16, 2008

(30) Foreign Application Priority Data

Apr. 13, 2007 (JP) ................................ 2007-106407
Oct. 15, 2007 (JP) ................................ 2007-268399
Mar. 26, 2008 (JP) ................................ 2008-080244

(51) Int. Cl.
*G11B 7/24* (2006.01)
(52) U.S. Cl. ............... 428/64.8; 428/64.4; 430/270.16; 430/945; G9B/7.149; G9B/7.155; 534/703; 534/710
(58) Field of Classification Search ............... 428/64.4, 428/64.8; 430/270.16, 945; 534/703, 710; G9B/7.149, 7.155
See application file for complete search history.

(56) References Cited

U.S. PATENT DOCUMENTS

| 3,133,051 A * | 5/1964 | Dreyer et al. ............... 534/710 |
| 3,725,383 A * | 4/1973 | Austin et al. ............... 534/628 |
| 7,754,863 B2 * | 7/2010 | Bacher et al. ............... 534/698 |
| 2007/0077522 A1 * | 4/2007 | Satoh et al. ............. 430/270.11 |
| 2008/0081286 A1 * | 4/2008 | Watanabe et al. ......... 430/281.1 |

FOREIGN PATENT DOCUMENTS

| EP | 1864822 A1 | 12/2007 |
| JP | 11-130970 A | 5/1999 |
| JP | 11-310728 A | 11/1999 |
| JP | 2000-168237 A | 6/2000 |
| JP | 2001-158862 A | 6/2001 |
| JP | 2002-274040 A | 9/2002 |
| JP | 2006142789 A * | 6/2006 |
| JP | 2006-306070 A | 11/2006 |
| WO | WO 2006018352 A1 * | 2/2006 |

OTHER PUBLICATIONS

Davidenko et al. "Optical, Electrical, and Photophysical Properties of Films of Polycomplexes of Azobenzene derivatives with Cobalt, Optics and Spectroscopy", 2006, vol. 101, p. 906-913.*
Machine translation of detailed description of JP 2006-142789 created on Mar. 9, 2011.*

* cited by examiner

*Primary Examiner* — Gerard Higgins
(74) *Attorney, Agent, or Firm* — Sughrue Mion, PLLC

(57) ABSTRACT

The optical information recording medium comprises a recording layer on a surface of a support. The surface of the support has pregrooves with a track pitch ranging from 50 to 500 nm, the recording layer comprises an azo metal complex dye, the azo metal complex dye is a complex of one or more azo dye and transition metal ions of which number is equal to or greater than the number of the azo dye. The azo metal complex dye comprises two or more transition metal ions per molecule, and in a molecule of the azo metal complex dye.

15 Claims, 1 Drawing Sheet

OPTICAL INFORMATION RECORDING MEDIUM, METHOD OF RECORDING INFORMATION, AND AZO METAL COMPLEX DYE

CROSS-REFERENCE TO RELATED APPLICATIONS

This application claims the benefit of priority under 35 USC 119 to Japanese Patent Application No. 2007-106407 filed on Apr. 13, 2007, Japanese Patent Application No. 2007-268399 filed on Oct. 15, 2007, and Japanese Patent Application No. 2008-080244 filed on Mar. 26, 2008, which are expressly incorporated herein by reference in their entirety.

BACKGROUND OF THE INVENTION

1. Field of the Invention

The present invention relates to an optical information recording medium permitting the recording and reproducing of information with a laser beam, and more particularly, to a heat mode optical information recording medium suited to the recording and reproducing of information with a short-wavelength laser beam with a wavelength of equal to or shorter than 440 nm and to a method of recording information on the optical information recording medium by irradiation of a short-wavelength laser beam with a wavelength of equal to or shorter than 440 nm.

The present invention further relates to a novel azo metal complex dye suitable for use as a dye in the recording layer of an optical information recording medium.

2. Discussion of the Background

The recordable CD (CD-R) and recordable DVD (DVD-R) have been known as optical information recording media permitting the "write-once" recording of information with a laser beam. In contrast to the recording of information on a CD-R, which is conducted with a laser beam in the infrared range (normally, at a wavelength of about 780 nm), the recording of information on a DVD-R is conducted with a visible light laser beam (with a wavelength of about 630 to 680 nm). Since a recording laser beam of shorter wavelength is employed for a DVD-R than for a CD-R, the DVD-R has an advantage of being able to record at higher density than on a CD-R. Thus, the status of the DVD-R as a high-capacity recording medium has to some degree been ensured in recent years.

Networks, such as the Internet, and high-definition television have recently achieved widespread popularity. With high-definition television (HDTV) broadcasts near at hand, demand is growing for high-capacity recording media for recording image information both economically and conveniently. However, the CD-R and DVD-R do not afford recording capacities that are adequate to handle future needs. Accordingly, to increase the recording density by using a laser beam of even shorter wavelength than that employed in a DVD-R, the development of high-capacity disks capable of recording with laser beams of short wavelength is progressing. For example, an optical recording disk known as the "Blu-ray," employing a blue laser of 405 nm, and HD-DVD have been proposed.

For example, Reference 1 (Japanese Unexamined Patent Publication (KOKAI) Heisei No. 11-310728), Reference 2 (Japanese Unexamined Patent Publication (KOKAI) Heisei No. 11-130970), Reference 3 (Japanese Unexamined Patent Publication (KOKAI) No. 2002-274040), and Reference 4 (Japanese Unexamined Patent Publication (KOKAI) No. 2000-168237), which are expressly incorporated herein by reference in their entirety, propose the use of azo metal complex dyes as dyes contained in the recording layer in DVD-R optical disks. These azo metal complex dyes have absorption waveforms corresponding to red lasers, and cannot achieve adequate recording characteristics in recording by laser beams of short wavelength (for example, 405 nm).

Accordingly, in optical recording disks employing short-wavelength laser beams (such as a 405 nm blue laser beam), attempts are being made to shorten the absorption wavelength of the azo metal complexes employed in DVD-Rs. These attempts are disclosed in, for example, Reference 5 (Japanese Unexamined Patent Publication (KOKAI) No. 2001-158862), Reference 6 (Japanese Unexamined Patent Publication (KOKAI) No. 2006-142789), Reference 7 (Japanese Unexamined Patent Publication (KOKAI) No. 2006-306070) or English language family member EP 1 864 822 A1, which are expressly incorporated herein by reference in their entirety.

We evaluated the light resistance of the dye films and the recording and reproduction characteristics of optical information recording media corresponding to short wavelength lasers, such as blue lasers, for the azo metal complexes described in References 5 to 7. As a result, we found that none of these azo metal complexes achieved both light resistance and recording and reproduction characteristics (jitter and reproduction durability).

SUMMARY OF THE INVENTION

An aspect of the present invention provides for an optical information recording medium, affording good recording and reproduction characteristics and good light resistance in recording and reproduction by irradiation of a short-wavelength laser beam (particularly in information recording by irradiation of a laser beam having a wavelength of equal to or shorter than 440 nm), and a novel compound, suitable for use as a dye in the recording layer of the above optical information recording medium.

We conducted extensive research into the light resistance of dyes and the recording and reproduction characteristics of optical information recording media corresponding to blue lasers, resulting in the following discoveries.

The azo metal complex dyes specifically disclosed in References 5 to 7 are all azo metal complex dyes in which two molecules of azo dyes are coordinated to one metal ion. However, these metal complexes are incapable of affording adequate light resistance and recording and reproduction characteristics in recording and reproduction by irradiation of the above-described short-wavelength laser beam.

Accordingly, we conducted further research, resulting in the discovery that, among azo metal complex dyes, those azo metal complex dyes comprising transition metal ions afforded good recording and reproduction characteristics in the short-wavelength region. However, even among azo metal complex dyes containing transition metal ions, no dye affording both good light resistance and recording and reproduction characteristics was discovered among the azo metal complex dyes described in References 5 to 7. Nor was any dye affording good reproduction durability discovered among the above-described azo metal complex dyes.

On the basis of these discoveries, we thought that the above azo metal complex dyes might be unable to afford either light resistance or reproduction durability due to an inability to efficiently deactivate the excited state of the azo molecules as ligands. Accordingly, we conceived that by making the number of transition metal ions in an azo metal complex dye either the same or greater than the number of azo dye molecules, and by increasing the number of transition metal ions forming coordination bonds with a single molecule of azo dye, it would be possible to promote the displacement of energy from the azo ligands to the metal ions. On this basis, we discovered that an optical information recording medium affording good light resistance, good reproduction durability for irradiation of a short-wavelength laser, and good recording and reproduction characteristics could be achieved.

We also discovered that by employing a specific azo metal complex dye in which a number ratio of copper ions to azo dye molecules as ligands was 2 to 2, or 5 to 4 as the dye employed in the recording layer of an optical information recording medium corresponding to a short-wavelength laser such as a Blu-ray disc, not only could good recording and reproduction characteristics be achieved, but the dyes also had good light resistance and solubility, and the dye films that were formed also afforded good stability.

The present invention was devised on the basis of these discoveries.

An aspect of the present invention relates to an optical information recording medium comprising a recording layer on a surface of a support, wherein the surface of the support has pregrooves with a track pitch ranging from 50 to 500 nm, the recording layer comprises an azo metal complex dye, the azo metal complex dye is a complex of one or more azo dye and transition metal ions of which number is equal to or greater than the number of the azo dye, the azo metal complex dye comprising two or more transition metal ions per molecule, and in a molecule of the azo metal complex dye, a plural transition metal ions present may be identical or different from each other and plural azo dyes may be identical or different from each other when plural azo dyes are present in a molecule of the azo metal complex dye.

The azo metal complex dye may exhibit a result indicating that two azo dyes and two transition metal ions are comprised per molecule by at least one analysis selected from the group consisting of ESI-MS, MALDI-MS, and X-ray structural analysis.

The azo metal complex dye may exhibit a result indicating that four azo dyes and five transition metal ions are comprised per molecule by at least one analysis selected from the group consisting of ESI-MS, MALDI-MS, and X-ray structural analysis.

The azo dye may comprise a partial structure denoted by general formula (A).

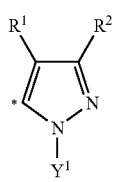

General formula (A)

In general formula (A), $R^1$ and $R^2$ each independently denote a hydrogen atom or a substituent, $Y^1$ denotes a hydrogen atom that may be dissociated from the partial structure denoted by general formula (A) in the recording layer, and * denotes a binding position with —N=N— group.

The azo dye may be an azo dye denoted by general formula (1).

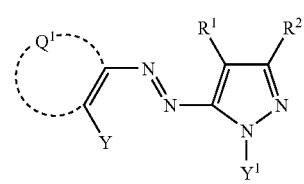

General formula (1)

In general formula (1), $Q^1$ denotes an atom group forming a heterocyclic ring or a carbon ring, Y denotes a group comprising a hydrogen atom that may be dissociated from the azo dye denoted by general formula (1) in the recording layer, and $R^1$, $R^2$, and $Y^1$ are defined respectively as in general formula (A).

The azo metal complex dye may be one obtained by reaction of the azo dye denoted by general formula (1) with transition metal ions in the presence of a base.

The recording layer may comprise a base.

In general formulas (1), the following partial structure:

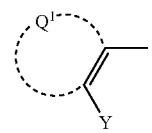

may denote the following partial structural formula (E-1) to (E-6) or (E-8).

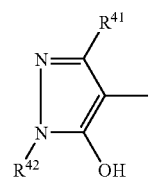

(E-1)

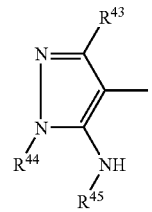

(E-2)

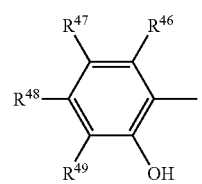

(E-3)

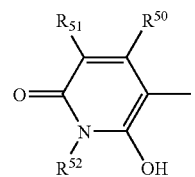

(E-4)

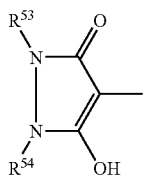
(E-5)

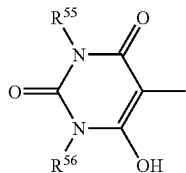
(E-6)

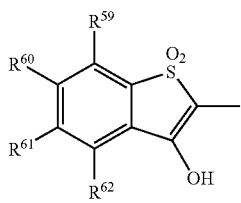
(E-8)

In the above, $R^{41}$ to $R^{56}$ and $R^{59}$ to $R^{62}$ each independently denote a hydrogen atom or a substituent, the subsubstituent may bond with an adjacent substituent to form a ring, and when $R^{46}$ to $R^{49}$ each independently denote a substituent, the substituent is a substituent other than an amino group, a hydroxyl group, an alkoxy group, and an aryloxy group.

The transition metal ion may be a copper ion.

In general formulas (A) and (1), $R^1$ may denote a substituted or unsubstituted alkyloxycarbonyl group having 2 to 10 carbon atoms or a cyano group.

The azo metal complex dye may be an azo metal complex dye denoted by general formula (F) or (H).

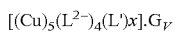 General formula (F)

In general formula (F), $L^{2-}$ denotes a divalent anion in which two hydrogen atoms have been dissociated from the azo dye denoted by general formula (2), G denotes an ion neutralizing a charge, v denotes an integer ranging from 0 to 2, L' denotes a ligand, and x denotes an integer ranging from 0 to 6.

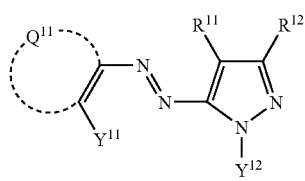 General formula (2)

In general formula (2), $Y^{11}$ denotes a group comprising one of the two hydrogen atoms, $Y^{12}$ denotes the other hydrogen atom of the above two hydrogen atoms, $R^{11}$ denotes a substituted or unsubstituted alkyloxycarbonyl group having 2 to 10 carbon atoms or a cyano group, the following partial structure:

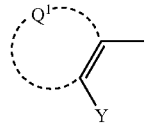

denotes the following partial structural formula (E-1) to (E-6) or (E-8).

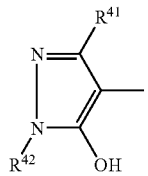 (E-1)

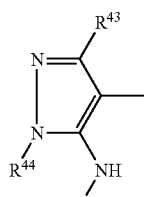 (E-2)

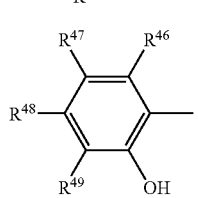 (E-3)

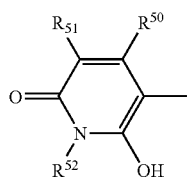 (E-4)

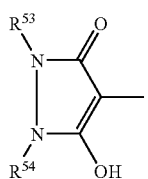 (E-5)

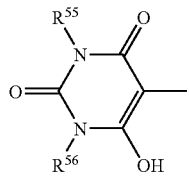 (E-6)

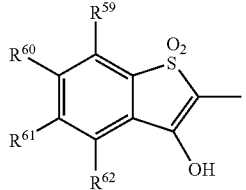 (E-8)

In the above, $R^{41}$ to $R^{56}$ and $R^{59}$ to $R^{62}$ each independently denote a hydrogen atom or a substituent, the subsubstituent may bond with an adjacent substituent to form a ring, and when $R^{46}$ to $R^{49}$ each independently denote a substituent, the substituent is a substituent other than an amino group, a hydroxyl group, an alkoxy group, and an aryloxy group.

General formula (H)

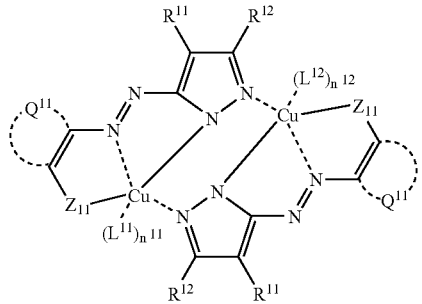

In general formula (H), $Z^{11}$ denotes a group in which a hydrogen atom has been dissociated from $Y^{11}$ in the following partial structure.

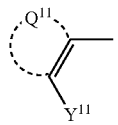

In the above partial structure, $R^{11}$ and $R^{12}$ are defined respectively as in general formula (F). In general formula (H), two $Q^{11}$s, two $Z^{11}$s, two $R^{11}$s, and two $R^{12}$s present may be respectively identical or different from each other, $L^{11}$ and $L^{12}$ each independently denote a ligand, $n^{11}$ and $n^{12}$ each independently denote an integer ranging from 0 to 2, when plural $L^{11}$s are present, the plural $L^{11}$s may be identical or different from each other, and when plural $L^{12}$s are present, the plural $L^{12}$s may be identical or different from each other.

In the optical information recording medium, information may be recorded by irradiation of a laser beam having a wavelength of equal to or shorter than 440 nm.

The optical information recording medium may further comprises a reflective layer between the support and the recording layer, and the laser beam may be irradiated onto the recording layer from an opposite surface side, the opposite surface being opposite from the surface facing the reflective layer.

An another aspect of the present invention relates to a method of recording information on the optical information recording medium by irradiation of a laser beam having a wavelength of equal to or shorter than 440 nm onto the recording layer comprised in the optical information recording medium.

A further aspect of the present invention relates to an azo metal complex dye denoted by the above general formula (F) or (H).

The present invention can provide an optical information recording medium affording good recording and reproduction characteristics with a blue laser beam having a wavelength of equal to or shorter than 440 nm as well as having extremely good light resistance (in particular, an optical information recording medium permitting the recording of information by irradiation of a laser beam with a wavelength of equal to or shorter than 440 nm).

Since the azo metal complex dye can exhibit excellent light resistance, it is suitable for various uses. It is particularly suitable as an optical information recording material because of good film stability.

Other exemplary embodiments and advantages of the present invention may be ascertained by reviewing the present disclosure and the accompanying drawings.

BRIEF DESCRIPTION OF THE DRAWINGS

The present invention will be described in the following text by the exemplary, non-limiting embodiments shown in the figures, wherein.

Figure 1:
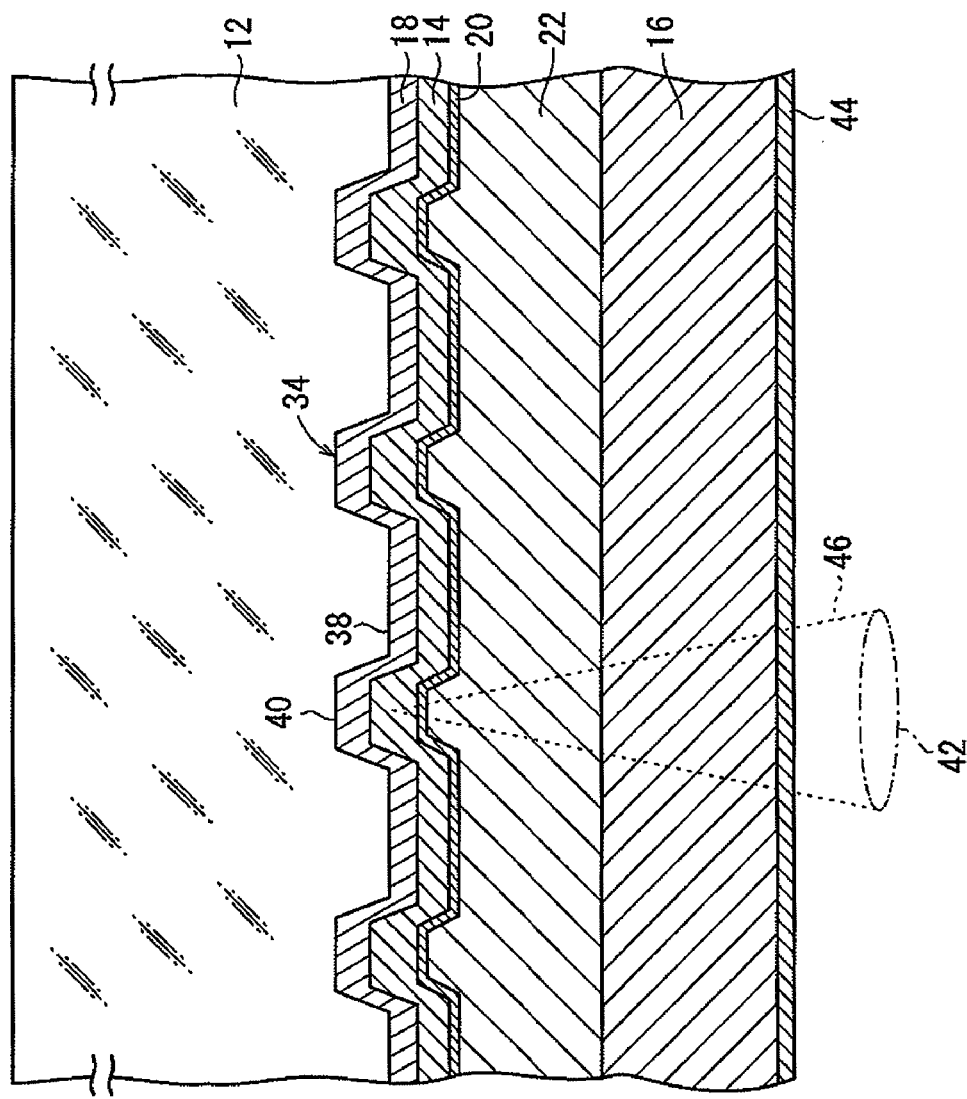
FIG. 1 is a schematic sectional view of an example of the optical information recording medium of the present invention.

Explanations of symbols in the drawings are as follows:
10A First optical information recording medium
12 First support
14 First recordable recording layer
16 Cover layer
18 First light reflective layer
20 Barrier layer
22 First bonding layer or first adhesive layer
44 Hard coat layer

DESCRIPTIONS OF THE EMBODIMENTS

The following preferred specific embodiments are, therefore, to be construed as merely illustrative, and non-limiting to the remainder of the disclosure in any way whatsoever. In this regard, no attempt is made to show structural details of the present invention in more detail than is necessary for fundamental understanding of the present invention; the description taken with the drawings making apparent to those skilled in the art how several forms of the present invention may be embodied in practice.

The optical information recording medium, the method of recording information and the azo metal complex dye of the present invention will be described in detail below.
Optical Information Recording Medium The optical information recording medium of the present invention comprises a recording layer, directly or through an layer such as a reflective layer, on a surface of a support. The surface of the support on which the recording layer is provided has pregrooves with a track pitch ranging from 50 to 500 nm. The optical information recording medium of the present invention is suitable as a high-density recording optical disk for recording information with short-wavelength lasers, such as a BD or HD-DVD.

The above-described high-density recording optical disk is structurally characterized by a narrower track pitch than conventional recordable optical disks. Further, optical disks of the BD-R configuration have a layer structure, differing from that of conventional recordable optical disks, in the form of a reflective layer and a recording layer sequentially provided on a support, and a relatively thin protective layer (commonly referred to as a "cover layer") present on the recording layer. In such optical information recording media for recording with short-wavelength laser, there has been a problem in that adequate recording and reproduction characteristics cannot be achieved with the dyes employed as recording dyes in conventional recordable optical information recording media such as CD-Rs and DVD-Rs.

By contrast, in the present invention, it is possible to achieve good recording and reproduction characteristics in optical information recording media of narrower track pitch than conventional recordable optical information recording media by incorporating into the recording layer an azo metal complex dye that is a complex of one or more azo dye and transition metal ions of which number is equal to or greater than the number of the azo dye as well as comprises two or more transition metal ions per molecule. The optical information recording medium of the present invention can afford good recording and reproduction characteristics by irradiation of a laser beam of short wavelength (such as a wavelength of equal to or shorter than 440 nm), extremely good light resistance, and good humidity and heat storage properties. In particular, the optical information recording medium of the present invention is suitable as a BD-R configuration medium comprising a reflective layer between the support and the recording layer, in which a laser beam for recording and reproduction is irradiated onto the recording layer from an opposite surface side, the opposite surface being opposite from the surface facing the reflective layer.

Further, the azo metal complex dye of the present invention denoted by general formula (F) or (H) was discovered to afford extremely good light resistance, good solubility, and excellent film stability. In this manner, the present invention can provide an optical information recording medium affording excellent recording characteristics with irradiation by a short-wavelength laser, highlight resistance, excellent solubility, and excellent film stability.

In the present invention, the term "azo dye" means an azo compound having an azo structure that is capable of forming a complex with a metal ion, and includes the case where it is present as a ligand in the metal complex. For example, when two azo ligands are coordinated to a single metal ion within a single molecule, the number of azo dye in a single molecule is 2. The case where an azo dye forms a complex with a metal ion is referred to as an "azo metal complex." In the present invention, the term "azo ligand" refers to the case where an azo dye becomes a ligand. The azo ligand becomes an anionic ligand by losing a dissociative hydrogen atom, and preferably becomes a divalent anionic ligand by losing two dissociative hydrogen atoms.

In the present invention, the term "transition metal ion" refers to the ion of a transition metal atom. The term "transition metal atom" means elements having an incomplete d-electron shell, and includes the elements of groups IIIa to VIII and group Ib of the periodic table of the elements. The transition metal atom is not specifically limited; Mn, Fe, Co, Ni, Cu, and Zn are preferable, Cu and Zn are more preferable, and Cu is of greater preference.

Monovalent and divalent transition metal ions are preferred as the transition metal ion. Examples of monovalent and divalent transition metal ions are: $Mn^{2+}$, $Fe^{2+}$, $Co^{2+}$, $Ni^{2+}$, $Cu^+$, $Cu^{2+}$, $Zn^{2+}$, $Ru^{2+}$, $Pd^{2+}$, $Ag^+$, $Re^+$, $Pt^{2+}$, and $Au^+$. The incorporation of transition metal ions that become stable with a coordination number of four, such as $Cu^{2+}$, $Zn^{2+}$, $Pd^{2+}$, and $Pt^{2+}$ is preferable, and $Cu^{2+}$ is more preferable.

The recording layer of the optical information recording medium of the present invention will be described below.

The recording layer of the optical information recording medium of the present invention comprises an azo metal complex dye. The azo metal complex dye is a complex of one or more azo dye (including an azo ligand) and transition metal ions of which number is equal to or greater than the number of the azo dye. Furthermore, the azo metal complex dye comprises two or more transition metal ions per molecule. In a molecule of the azo metal complex dye, a plural transition metal ions present may be identical or different from each other and plural azo dyes may be identical or different from each other when plural azo dyes are present in a molecule of the azo metal complex dye. The azo metal complex dye in which the number of transition metal ions is equal to or greater than the number of azo dyes permits enhancement of the light resistance of the recording layer. It also permits enhancement of reproduction durability, thermal stability, and optical stability before and after recording. It suffices for the azo metal complex dye to comprise constituent components in the form of azo dyes and transition metal ions with the number of transition metal ions being equal to or greater than the number of azo dye; the complex may comprise other components such as ligands and ions neutralizing the charge of the molecule in addition to the azo dyes and the transition metal ions. However, azo dyes having the partial structures (1-1) or (1-2) below are excluded.

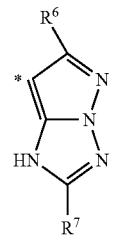

(1-1)

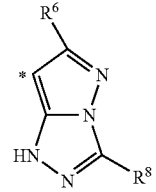

(1-2)

In the above, $R^6$, $R^7$ and $R^8$ each independently denote a hydrogen atom or a substituent, and * denotes a binding position with —N=N— group At least one azo dye comprised in the azo metal complex dye is preferably a divalent azo dye anion. This is because increasing the a donor property for enhancing energy transfer efficiency to increase splitting of the ligand field of the metal ions is thought to be desirable, since the efficient deactivation of the excited state of azo ligands is related to enhancing light resistance (see Kodansha Scientific, The Chemistry of Complexes, New Edition, ed. by the Basic Complex Engineering Research Institute, p. 30 to 42, which is expressly incorporated herein by reference in its entirety).

The azo metal complex dye comprises two or more transition metal ions per molecule, and preferably comprises at least one transition metal forming a coordination bond for one azo dye. Further, to enhance film stability, it is preferable for the azo dye to become crosslinking ligands so that two or more transition metal ions coordinate to one azo ligand. An azo metal complex dye comprising four azo dyes and five transition metal ions per molecule, and an azo metal complex dye comprising two azo dyes and two transition metal ions per molecule, are preferable. An example of a preferable embodiment of such an azo metal complex dye is an azo metal complex dye having the partial structure denoted by general formula (A). An example of a more preferable embodiment is an azo metal complex comprised of the transition metal ions and azo dyes denoted by general formula (1). An example of an embodiment of greater preference is an azo metal complex dye that is comprised of the transition metal ions and azo dyes denoted by general formula (1) and has the same coordination structure as the azo metal complex dye denoted by general formula (F) or (H). Examples of an embodiment of still greater preference are azo metal complex dyes denoted by general formulas (F) and (H). In an azo metal complex dye comprising plural azo dyes and plural transition metal ions per molecule as set forth above, the plural azo dyes may be identical or different from each other and the plural transition metal ions may be identical or different from each other. The plural azo dyes are preferably identical and the plural transition metal ions are preferably identical.

The various above-mentioned azo metal complexes will be described in detail below.

The above azo dye preferably has the partial structure denoted by general formula (A) below that is capable of forming a divalent azo dye anion.

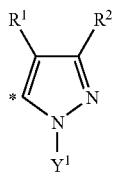

General formula (A)

In general formula (A), $R^1$ and $R^2$ each independently denote a hydrogen atom or a substituent, $Y^1$ denotes a hydrogen atom that may be dissociated from the partial structure denoted by general formula (A) in the recording layer, and * denotes a binding position with —N=N— group.

In general formula (A), $Y^1$ denotes a hydrogen atom that may be dissociated from the partial structure denoted by general formula (A) in the recording layer. In the partial structure denoted by general formula (A), dissociation of the hydrogen atom $Y^1$ on the pyrazole ring permits the formation of a complex with the transition metal ion through the other nitrogen atom on the pyrazole ring in partial structure (A), making it possible to achieve good film stability and good recording characteristics even when the number of transition metal ions exceeds the number of azo dyes.

In general formula (A), $R^1$ and $R^2$ each independently denote a hydrogen atom or a substituent. From the perspective of enhancing solubility, $R^1$ and $R^2$ are preferably substituents. The substituents are not specifically limited; examples are: halogen atoms, alkyl groups (including cycloalkyl groups and bicycloalkyl groups), alkenyl groups (including cycloalkenyl groups and bicycloalkenyl groups), alkynyl groups, aryl groups, heterocyclic groups, cyano groups, hydroxyl groups, nitro groups, carboxyl groups, alkoxy groups, aryloxy groups, silyloxy groups, heterocyclic oxy groups, acyloxy groups, carbamoyloxy groups, alkoxycarbonyloxy groups, aryloxycarbonyloxy groups, amino groups (including anilino groups), acylamino groups, aminocarbonylamino groups, alkoxycarbonylamino groups, aryloxycarbonylamino groups, sulfamoylamino groups, alkyl and arylsulfonylamino groups, mercapto groups, alkylthio groups, arylthio groups, heterocyclic thio groups, sulfamoyl groups, sulfo groups, alkyl and arylsulfinyl groups, alkyl and arylsulfonyl groups, acyl groups, aryloxycarbonyl groups, alkoxycarbonyl groups, carbamoyl groups, aryl and heterocyclic azo groups, imido groups, phosphino groups phosphinyl groups, phosphinyloxy groups, phosphinylamino groups, and silyl groups.

More specifically, $R^1$ and $R^2$ may denote: halogen atoms (such as chlorine atoms, bromine atoms, and iodine atoms), alkyl groups [linear, branched, or cyclic substituted or unsubstituted alkyl groups in the form of alkyl groups (preferably alkyl groups having 1 to 30 carbon atoms such as methyl groups, ethyl groups, n-propyl groups, isopropyl groups, t-butyl groups, n-octyl groups, eicosyl groups, 2-chloroethyl groups, 2-cyanoethyl groups, and 2-ethylhexyl groups), cycloalkyl groups (preferably substituted or unsubstituted cycloalkyl groups having 3 to 30 carbon atoms such as cyclohexyl groups, cyclopentyl groups, and 4-n-dodecylcyclohexyl groups), bicycloalkyl groups (preferably substituted or unsubstituted bicycloalkyl groups having 5 to 30 carbon atoms, that is, monovalent groups obtained by removing a single hydrogen atom from a bicycloalkane having 5 to 30 carbon atoms, such as bicyclo[1,2,2]heptane-2-yl and bicyclo[2,2,2]octane-3-yl), and tricyclo structures having an additional ring; the alkyl groups in the description of substituents given below (such as the alkyl group in an alkylthio group) denote this same concept of an alkyl group]; alkenyl groups [linear, branched, or cyclic substituted or unsubstituted alkenyl groups including alkenyl groups (preferably substituted or unsubstituted alkenyl groups having 2 to 30 carbon atoms, such as vinyl groups, allyl groups, prenyl groups, geranyl groups, and oleyl groups), cycloalkenyl groups (preferably substituted or unsubstituted cycloalkenyl groups having 3 to 30 carbon atoms, that is, monovalent groups obtained by removing a single hydrogen atom from a cycloalkene having 3 to 30 carbon atoms, such as 2-cyclopentene-1-yl and 2-cyclohexene-1-yl), bicycloalkenyl groups (substituted or unsubstituted bicycloalkenyl groups, preferably substituted or unsubstituted bicycloalkenyl groups having 5 to 30 carbon atoms, that is, monovalent groups obtained by removing a hydrogen atom from a bicycloalkene having a single double bond, such as bicyclo[2,2,1]hepto-2-ene-1-yl and bicyclo[2,2,2]-octo-2-ene-4-yl)]; alkynyl groups (preferably substituted or unsubstituted alkynyl groups having 2 to 30 carbon atoms such as ethynyl groups, propargyl groups, trimethylsilylethynyl groups, and aryl groups (preferably substituted or unsubstituted aryl groups having 6 to 30 carbon atoms, such as phenyl groups, p-tolyl groups, naphthyl groups, m-chlorophenyl groups, and o-hexadecanoylaminophenyl groups); heterocyclic groups (preferably monovalent groups obtained by removing a single hydrogen atom from a substituted or unsubstituted five or six-membered aromatic or nonaromatic heterocyclic compound; more preferably five or six-membered aromatic heterocyclic groups having 3 to 30 carbon atoms, such as 2-furyl groups, 2-thienyl groups, 2-pyrimidinyl groups, and 2-benzothiazolyl groups); cyano groups; hydroxyl groups; nitro groups; carboxyl groups; alkoxy groups (preferably substituted or unsubstituted alkoxy groups having 1 to 30 carbon atoms, such as methoxy groups, ethoxy groups, isopropoxy groups, t-butoxy groups, n-octyloxy groups, and 2-methoxyethoxy groups); aryloxy groups (preferably substituted or unsubstituted aryloxy groups having 6 to 30 carbon atoms, such as phenoxy groups, 2-methylphenoxy groups, 4-t-butylphenoxy groups, 3-nitrophenoxy groups, and 2-tetradecanoylaminophenoxy groups); silyloxy groups (preferably silyloxy groups having 3 to 20 carbon atoms, such as trimethylsilyloxy groups and t-butyldimethylsilyloxy groups); heterocyclic oxy groups (preferably substituted or unsubstituted heterocyclic oxy groups having 2 to 30 carbon atoms, 1-phenyltetrazole-5-oxy groups, and 2-tetrahydropyranyloxy groups); acyloxy groups (preferably formyloxy groups, substituted or unsubstituted alkylcarbonyloxy groups having 2 to 30 carbon atoms, substituted or unsubstituted arylcarbonyloxy groups having 6 to 30 carbon atoms, such as formyloxy groups, acetyloxy groups, pivaloyloxy groups, stearoyloxy groups, benzoyloxy groups, and p-methoxyphenylcarbonyloxy groups); carbamoyloxy groups (preferably substituted or unsubstituted carbamoyloxy groups having 1 to 30 carbon atoms, such as N,N-dimethylcarbamoyloxy groups, N,N-diethylcarbamoyloxy groups, morpholinocarbonyloxy groups, N,N-di-n-octylaminocarbonyloxy groups, and N-n-octylcarbamoyloxy groups); alkoxycarbonyloxy groups (preferably substituted or unsubstituted alkoxycarbonyloxy groups having 2 to 30 carbon atoms, such as methoxycarbonyloxy groups, ethoxycarbonyloxy groups, t-butoxycarbonyloxy groups, and n-octylcarbonyloxy groups); aryloxycarbonyloxy groups (preferably substituted or unsubstituted aryloxycarbonyloxy groups having 7 to 30 carbon atoms, such as phenoxycarbonyloxy groups, p-methoxyphenoxycarbonyloxy groups, and p-n-hexadecyloxyphenoxycarbonyloxy groups); amino groups (preferably amino groups, substituted or unsubstituted alkylamino groups having 1 to 30 carbon atoms and substituted or unsubstituted anilino groups having 6 to 30 carbon atoms such as amino groups, methylamino groups, dimethylamino groups, anilino groups, N-methylanilino groups, and diphenylamino groups); acylamino groups (preferably formylamino groups, substituted or unsubstituted alkylcarbonylamino groups having 1 to 30 carbon atoms, and substituted or unsubstituted arylcarbonylamino groups having 6 to 30 carbon atoms, such as formylamino groups, acetylamino groups, pivaloylamino groups, lauroylamino groups, benzoylamino groups, and 3,4,5-tri-n-octyloxyphenylcarbonylamino groups); aminocarbonylamino groups (preferably substituted or unsubstituted aminocarbonylamino groups having 1 to 30 carbon atoms, such as carbamoylamino groups, N,N-dimethylaminocarbonylamino groups, N,N-diethylaminocarbonylamino groups, and morpholinocarbonylamino groups); alkoxycarbonylamino groups (preferably substituted or unsubstituted alkoxycarbonylamino groups having 2 to 30 carbon atoms, such as methoxycarbonylamino groups, ethoxycarbonylamino groups, t-butoxycarbonylamino groups, n-octadecyloxycarbonylamino groups, and N-methylmethoxycarbonylamino groups); aryloxycarbonylamino groups (preferably substituted or unsubstituted aryloxycarbonylamino groups having 7 to 30 carbon atoms, such as phenoxycarbonylamino groups, p-chlorophenoxycarbonylamino groups, and m-n-octyloxyphenoxycarbonylamino groups); sulfamoylamino groups (preferably substituted or unsubstituted sulfamoylamino groups having 0 to 30 carbon atoms, such as sulfamoylamino groups, N,N-dimethylaminosulfonylamino groups, and N-n-octylaminosulfonylamino groups); alkyl and arylsulfonylamino groups (preferably substituted or unsubstituted alkylsulfonylamino groups having 1 to 30 carbon atoms and substituted or unsubstituted arylsulfonylamino groups having 6 to 30 carbon atoms, such as methylsulfonylamino groups, butylsulfonylamino groups, phenylsulfonylamino groups, 2,3,5-trichlorophenylsulfonylamino groups, and p-methylphenylsulfonylamino groups); mercapto groups; alkylthio groups (preferably substituted or unsubstituted alkylthio groups having 1 to 30 carbon atoms, such as methylthio groups, ethylthio groups, and n-hexadecylthio groups); arylthio groups (preferably substituted or unsubstituted arylthio groups having 6 to 30 carbon atoms, such as phenylthio groups, p-chlorophenylthio groups, and m-methoxyphenylthio groups); heterocyclic thio groups (preferably substituted or unsubstituted heterocyclic thio groups having 2 to 30 carbon atoms, such as 2-benzothiazolylthio groups and 1-phenyltetrazole-5-ylthio groups); sulfamoyl groups (preferably substituted or unsubstituted sulfamoyl groups having 0 to 30 carbon atoms, such as N-ethylsulfamoyl groups, N-(3-dodecyloxypropyl)sulfamoyl groups, N,N-dimethylsulfamoyl groups, N-acetylsulfamoyl groups, N-benzoylsulfamoyl groups, N—(N'-phenylcarbamoyl)sulfamoyl groups); sulfo groups; alkyl and arylsulfinyl groups (preferably substituted or unsubstituted alkylsulfinyl groups having 1 to 30 carbon atoms and substituted or unsubstituted arylsulfinyl groups having 6 to 30 carbon atoms, such as methylsulfinyl groups, ethylsulfinyl groups, phenylsulfinyl groups, and p-methylphenylsulfinyl groups); alkyl and arylsulfonyl groups (preferably substituted or unsubstituted alkylsulfonyl groups having 1 to 30 carbon atoms and substituted or unsubstituted arylsulfonyl groups having 6 to 30 carbon atoms, such as methylsulfonyl groups, ethylsulfonyl groups, phenylsulfonyl groups, and p-methylphenylsulfonyl groups); acyl groups (preferably formyl groups, substituted or unsubstituted alkylcarbonyl groups having 2 to 30 carbon atoms, substituted or unsubstituted arylcarbonyl groups having 7 to 30 carbon atoms, and substituted or unsubstituted heterocyclic carbonyl groups having 4 to 30 carbon atoms and bound to carbonyl groups through carbon atoms, such as acetyl groups, pivaloyl groups, 2-chloroacetyl groups, stearoyl groups, benzoyl groups, p-n-octyloxyphenylcarbonyl groups, 2-pyridylcarbonyl groups, and 2-furylcarbonyl groups); aryloxycarbonyl groups (preferably substituted or unsubstituted aryloxycarbonyl groups having 7 to 30 carbon atoms, such as phenoxycarbonyl groups, o-chlorophenoxycarbonyl groups, m-nitrophenoxycarbonyl groups, and p-t-butylphenoxycarbonyl groups); alkoxycarbonyl groups (preferably substituted or unsubstituted alkoxycarbonyl groups having 2 to 30 carbon atoms, such as methoxycarbonyl groups, ethoxycarbonyl groups, t-butoxycarbonyl groups, and n-octadecyloxycarbonyl groups); carbamoyl groups (preferably substituted or unsubstituted carbamoyl groups having 1 to 30 carbon atoms, such as carbamoyl groups, N-methylcarbamoyl groups, N,N-dimethylcarbamoyl groups, N,N-di-n-octylcarbamoyl groups, and N-(methylsulfonyl)carbamoyl groups); aryl and heterocyclic azo groups (preferably substituted or unsubstituted arylazo groups having 6 to 30 carbon atoms and substituted or unsubstituted heterocyclic azo groups having 3 to 30 carbon atoms, such as phenylazo groups, p-chlorophenylazo groups, and 5-ethylthio-1,3,4-thiadiazole-2-ylazo groups); imido groups (preferably N-succinimide and N-phthalimide); phosphino groups (preferably substituted or unsubstituted phosphino groups having 2 to 30 carbon atoms, such as dimethylphosphino groups, diphenylphosphino groups, and methylphenoxyphosphino groups); phosphinyl groups (preferably substituted or unsubstituted phosphinyl groups having 2 to 30 carbon atoms, such as phosphinyl groups, dioctyloxyphosphinyl groups, and diethoxyphosphinyl groups); phosphinyloxy groups (preferably substituted or unsubstituted phosphinyloxy groups having 2 to 30 carbon atoms, such as diphenoxyphosphinyloxy groups, and dioctyloxyphosphinyloxy groups); phosphinylamino groups (preferably substituted or unsubstituted phosphinylamino groups having 2 to 30 carbon atoms, such as dimethoxyphosphinylamino groups and dimethylaminophosphinylamino groups); and silyl groups (preferably substituted or unsubstituted silyl groups having 3 to 30 carbon atoms, such as trimethylsilyl groups, t-butyldimethylsilyl groups, and phenyldimethylsilyl groups).

In those of the above functional groups that have a hydrogen atom, the hydrogen atom may be replaced with a substituent in the form of one of the above groups. Examples of such functional groups are alkylcarbonylaminosulfonyl groups, arylcarbonylaminosulfonyl groups, alkylsulfonylaminocarbonyl groups, and arylsulfonylaminocarbonyl groups. Examples thereof are methylsulfonylaminocarbonyl groups, p-methylphenylsulfonylaminocarbonyl groups, acetylaminosulfonyl groups, and benzoylaminosulfonyl groups.

From the perspectives of readily obtaining azo metal complexes of extremely good light resistance and solubility, $R^1$ preferably denotes an electron-withdrawing group. Examples of electron-withdrawing groups that are preferably selected as $R^1$ are: substituted or unsubstituted alkyloxycarbonyl groups having 2 to 10 carbon atoms, substituted or unsubstituted aryloxycarbonyl groups having 7 to 10 carbon atoms, substituted or unsubstituted alkylaminocarbonyl groups having 2 to 10 carbon atoms, substituted or unsubstituted arylaminocarbonyl groups having 7 to 10 carbon atoms, substituted or unsubstituted alkylsulfonyl groups having 1 to 10 carbon atoms, substituted or unsubstituted arylsulfonyl groups having 6 to 10 carbon atoms, and cyano groups. Examples of such groups that are more preferably selected are: substituted or unsubstituted alkyloxycarbonyl groups having 2 to 10 carbon atoms, substituted or unsubstituted alkylsulfonyl groups having 1 to 10 carbon atoms, and cyano groups. The selection of a substituted or unsubstituted alkyloxycarbonyl group having 2 to 10 carbon atoms or a cyano group is of greater preference. And a cyano group is of still greater preference.

$R^2$ preferably denotes a hydrogen atom, substituted or unsubstituted alkyl group having 1 to 10 carbon atoms, or substituted or unsubstituted aryl group having 6 to 10 carbon atoms. From the perspective of recording characteristics, a hydrogen atom or substituted or unsubstituted alkyl group having 1 to 10 carbon atoms is preferred; a hydrogen atom or substituted or unsubstituted alkyl group having 1 to 4 carbon atoms is of greater preference. From the perspective of solubility, a substituted or unsubstituted alkyl group having 1 to 4 carbon atoms is of even greater preference.

The azo dye denoted by general formula (1) below is preferable as the azo dye comprising the partial structure denoted by general formula (A) above.

General formula (1)

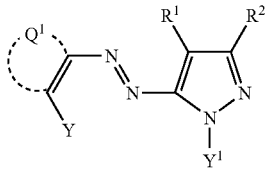

The azo dye denoted by general formula (1) is only described for the azo form in azo-hydrazone tautomeric equilibrium, but may also be in the corresponding hydrazone form. In that case, the hydrazone form is to be considered as the same component as the azo form in the present invention.

The pyrazole ring described in general formula (1) may also be a tautomeric structure. That case is also covered by general formula (1).

In general formula (1), each of $R^1$, $R^2$, and $Y^1$ is defined as in general formula (A), and the details thereof are as set forth above.

In general formula (1), $Q^1$ denotes an atom group forming a heterocyclic ring or a carbon ring. When $Q^1$ denotes an atom group forming a heterocyclic ring, it suffices for the ring formed by $Q^1$ to be a heterocyclic ring formed of carbon atoms and hetero atoms (such as oxygen atoms, sulfur atoms, and nitrogen atoms); there is no specific limitation. Examples are: the heterocyclic rings contained in the rings denoted by partial structure formulas (E-1) to (E-8) described further below, pyrrole rings, furan rings, thiophene rings, imidazole rings, thiazole rings, isothiazole rings, oxazole rings, isooxazole rings, pyridine rings, pyrazine rings, pyrimidine rings, and pyridazine rings. These rings may comprise substituents, and may be condensed.

A benzene ring is preferable as a carbon ring formed by $Q^1$. The benzene ring may comprise substituents and may be condensed. From the perspective of recording and reproduction characteristics, when condensed, it does not form a 10-π system condensed ring (such as a naphthalene ring or quinoline ring), or a 14-π system condensed ring (such as anthracene, phenanthrene, or phenanthroline). For the same reason, when this carbon ring is a benzene ring, the benzene ring is not substituted with an amine group, hydroxyl group, alkoxy group, or aryloxy group.

From the perspective of enhancing solubility, the above heterocyclic ring and carbon ring preferably comprise a substituent. Examples of the substituent are the groups given by way of example for the substituents denoted by $R^1$ and $R^2$.

Y denotes a group comprising a hydrogen atom that may be dissociated from the azo dye denoted by general formula (1) in the recording layer. The hydrogen atom refers to a hydrogen atom that tends to undergo deprotonation, and can dissociate in the course of forming a complex with a transition metal ion.

Examples of the group denoted by Y are: hydroxyl groups, amino groups (preferably substituted or unsubstituted alkylamino groups having 1 to 30 carbon atoms and substituted or unsubstituted anilino groups having 6 to 30 carbon atoms, such as amino groups, methylamino groups, dimethylamino groups, anilino groups, N-methylanilino groups, and diphenylamino groups), acylamino groups (preferably formylamino groups, substituted or unsubstituted alkylcarbonylamino groups having 1 to 30 carbon atoms, and substituted or unsubstituted arylcarbonylamino groups having 6 to 30 carbon atoms, such as formylamino groups, acetylamino group, pivaloylamino groups, lauroylamino groups, benzoylamino groups, and 3,4,5-tri-n-octyloxyphenylcarbonylamino groups), aminocarbonylamino groups (preferably substituted or unsubstituted aminocarbonylamino groups having 1 to 30 carbon atoms such as carbamoylamino groups, N,N-dimethylaminocarbonylamino groups, N,N-diethylaminocarbonylamino groups, and morpholinocarbonylamino groups), alkoxycarbonylamino groups (preferably substituted or unsubstituted alkoxycarbonylamino groups having 2 to 30 carbon atoms, such as methoxycarbonylamino groups, ethoxycarbonamino groups, t-butoxycarbonylamino groups, n-octadecyloxycarbonylamino groups, and N-methylmethoxycarbonylamino groups), aryloxycarbonylamino groups (preferably substituted or unsubstituted aryloxycarbonylamino groups having 7 to 30 carbon atoms, such as phenoxycarbonylamino groups, p-chlorophenoxycarbonylamino groups, and m-n-octyloxyphenoxycarbonylamino groups), sulfamoylamino groups (preferably substituted or unsubstituted sulfamoylamino groups having 0 to 30 carbon atoms, such as sulfamoylamino groups, N,N-dimethylaminosulfonylamino groups, and N-n-octylaminosulfonylamino groups), and alkyl and arylsulfonylamino groups (preferably substituted or unsubstituted alkylsulfonylamino groups having 1 to 30 carbon atoms and substituted or unsubstituted arylsulfonyl amino groups having 6 to 30 carbon atoms, such as methylsulfonylamino groups, butylsulfonylamino groups, phenylsulfonylamino groups, 2,3,5-trichlorophenylsulfonylamino groups, and p-methylphenylsulfonylamino groups).

Hydroxyl groups, substituted or unsubstituted sulfamoylamino groups having 0 to 10 carbon atoms, substituted or unsubstituted alkylsulfonylamino groups having 1 to 10 carbon atoms, and substituted or unsubstituted arylsulfonylamino groups having 3 to 10 carbon atoms are preferable. Substituted or unsubstituted sulfamoylamino groups having 0 to 10 carbon atoms and substituted or unsubstituted alkylsulfonylamino groups having 1 to 10 carbon atoms are more preferable.

When Y denotes an amino group comprising a substituent, the substituent may bond with the atom group denoted by $Q^1$ to form a ring. However, from the perspective of reproduction durability when irradiated with a short-wavelength laser beam, the ring that is formed is preferably neither above-described partial structure (1-1) nor (1-2).

Y preferably denotes a hydroxyl group, substituted or unsubstituted sulfamoylamino group having 0 to 4 carbon atoms, substituted or unsubstituted alkylsulfonylamino group having 1 to 4 carbon atoms, or substituted or unsubstituted arylsulfonylamino group having 3 to 10 carbon atoms; more preferably denotes a hydroxyl group, substituted or unsubstituted sulfamoylamino group having 0 to 4 carbon atoms, or substituted or unsubstituted alkylsulfonylamino group having 1 to 4 carbon atoms; and still more preferably denotes a hydroxyl group.

In general formula (1), specific examples of the following partial structure:

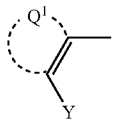

are the following partial structural formulas (E-1) to (E-8).

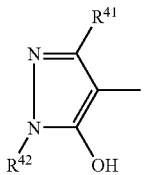 (E-1)

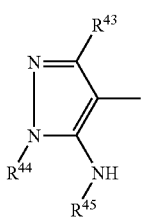 (E-2)

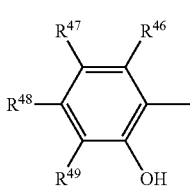 (E-3)

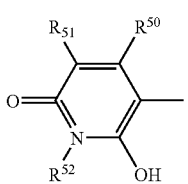 (E-4)

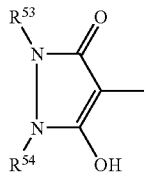 (E-5)

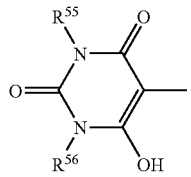 (E-6)

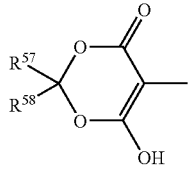 (E-7)

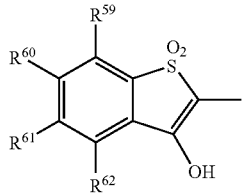 (E-8)

In the above, each of $R^{41}$, $R^{43}$, $R^{46}$ to $R^{49}$, $R^{50}$, $R^{51}$, $R^{57}$, $R^{57}$, $R^{58}$, and $R^{59}$ to $R^{62}$ independently denotes a hydrogen atom or a substituent, and the substituent may bond with an adjacent substituent to form a ring. When $R^{41}$ to $R^{62}$ denote substituents, the substituents are not specifically limited; examples are the substituents given by way of example for $R^1$ and $R^2$. However, $R^{46}$ to $R^{49}$ denote hydrogen atoms or substituents other than amino groups (including alkyl-substituted or aryl-substituted amino groups), hydroxyl groups, alkoxy groups, and aryloxy groups. This is to adapt to recording and reproduction by irradiation with short-wavelength laser beams.

Each of $R^{42}$, $R^{44}$, $R^{45}$, $R^{52}$, $R^{53}$, $R^{54}$, $R^{55}$, and $R^{56}$ independently denotes a hydrogen atom or a substituent. The substituents are not specifically limited; examples are: alkyl groups (including cycloalkyl groups and bicycloalkyl groups), alkenyl groups (including cycloalkenyl groups and bicycloalkenyl groups), aryl groups, heterocyclic groups, sulfamoyl groups, alkyl and arylsulfinyl groups, alkyl and arylsulfonyl groups, acyl groups, aryloxycarbonyl groups, alkoxycarbonyl groups, and carbamoyl groups.

Among the above partial structures, (E-1) to (E-6) and (E-8) are preferable, (E-1) to (E-3) and (E-8) are more preferable, (E-1), (E-3) and (E-8) are further preferable, and (E-1) and (E-3) are particularly preferable.

In (E-1), $R^{41}$ preferably denotes an alkyl group (including a cycloalkyl group or bicycloalkyl group), aryl group, heterocyclic group, cyano group, alkoxy group, aryloxy group, heterocyclic oxy group, aryloxycarbonyl group, or alkoxycarbonyl group; more preferably denotes an alkyl group, cyano group, alkoxy group, aryloxy group, or heterocyclic oxy group; and still more preferably denotes an alkyl group or alkoxy group.

$R^{42}$ preferably denotes an alkyl group (including cycloalkyl groups and bicycloalkyl groups), aryl group, or heterocyclic group; more preferably denotes an alkyl group or aryl group; and still more preferably denotes an aryl group.

In (E-3), $R^{46}$ to $R^{49}$ preferably denote alkyl groups (including cycloalkyl groups and bicycloalkyl groups), aryl groups, heterocyclic groups, alkoxy groups, aryloxy groups, heterocyclic oxy groups, aryloxycarbonyl groups, or alkoxycarbonyl groups; more preferably denote alkyl groups, aryloxycarbonyl groups, or alkoxycarbonyl groups; and still more preferably denote alkoxycarbonyl groups.

Specific examples of the azo dye denoted by general formula (1) will be given below. However, the present invention is not limited thereto.

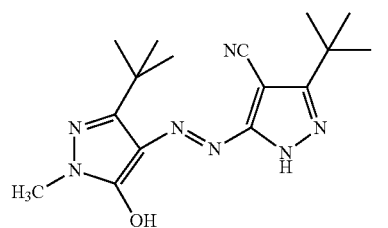
(L-1)

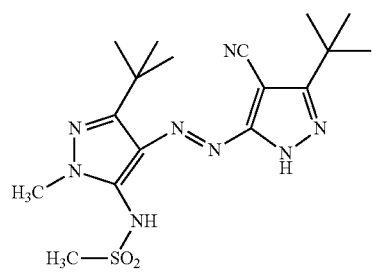
(L-2)

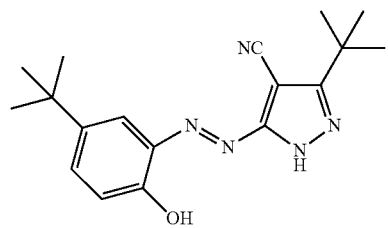
(L-3)

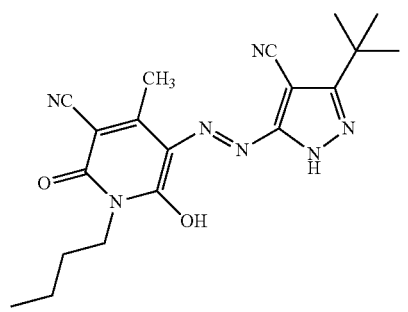
(L-4)

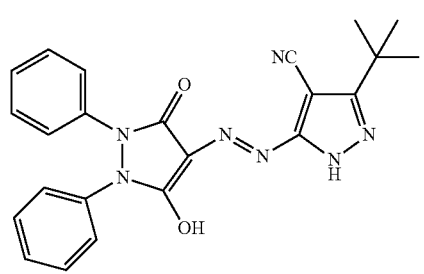
(L-5)

-continued

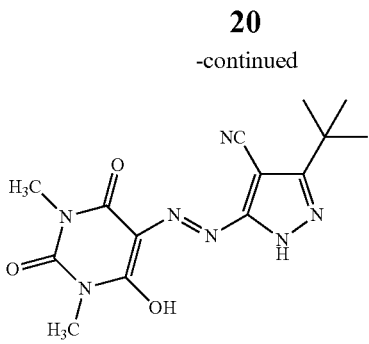
(L-6)

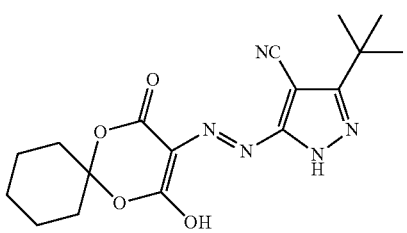
(L-7)

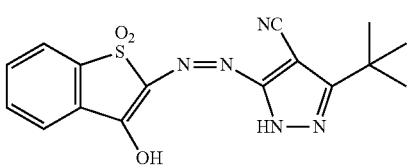
(L-8)

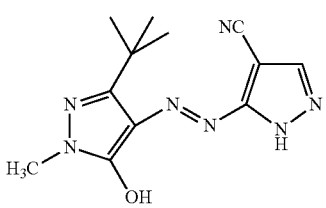
(L-9)

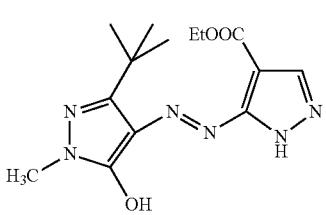
(L-10)

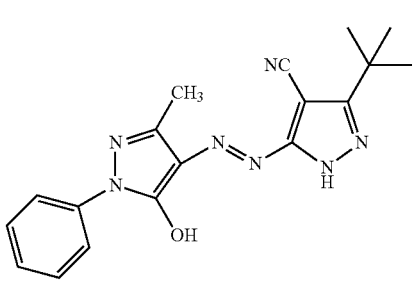
(L-11)

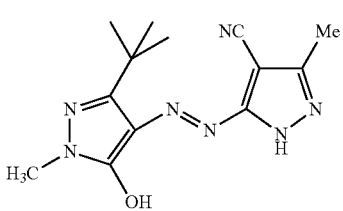
(L-12)

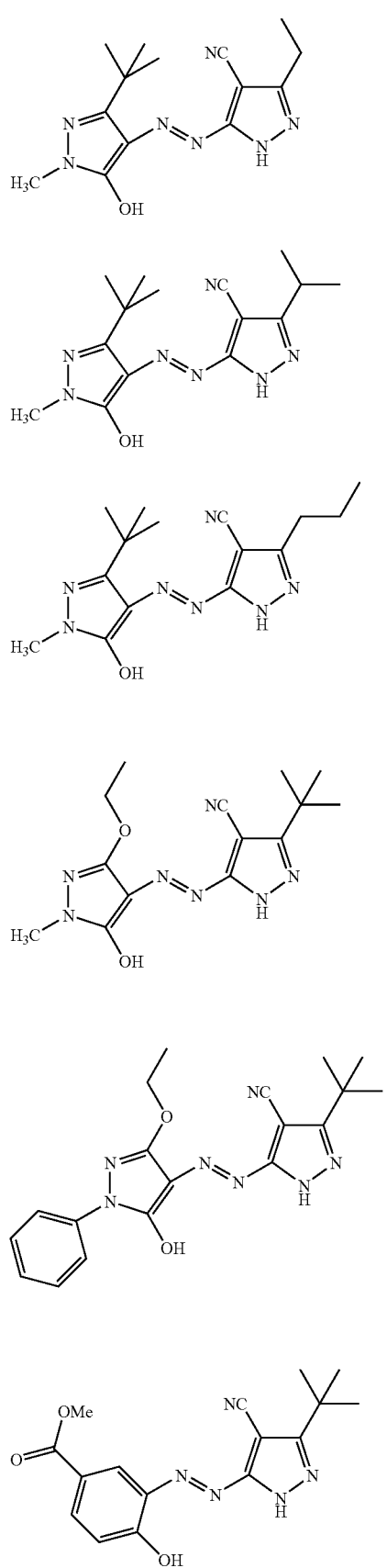
(L-13)
(L-14)
(L-15)
(L-16)
(L-17)
(L-18)
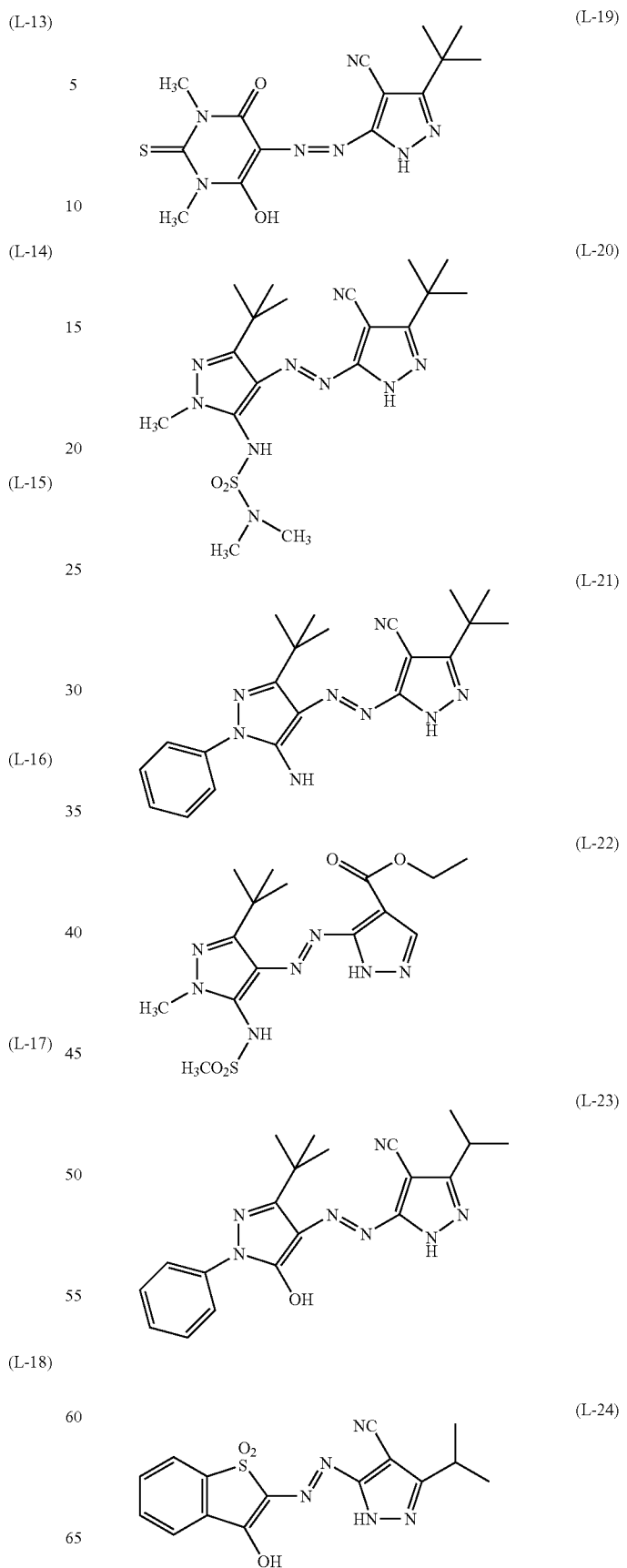
(L-19)
(L-20)
(L-21)
(L-22)
(L-23)
(L-24)

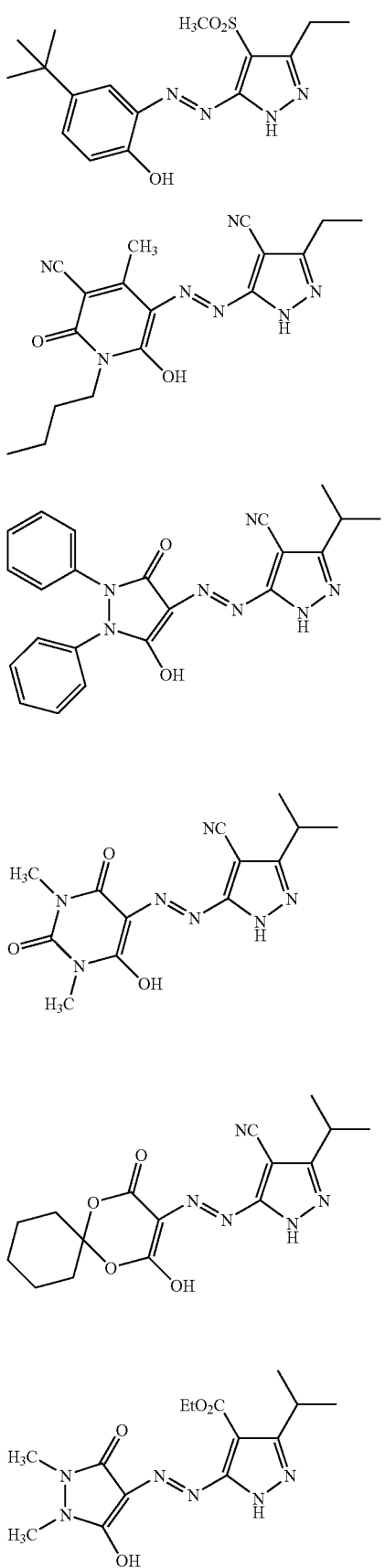
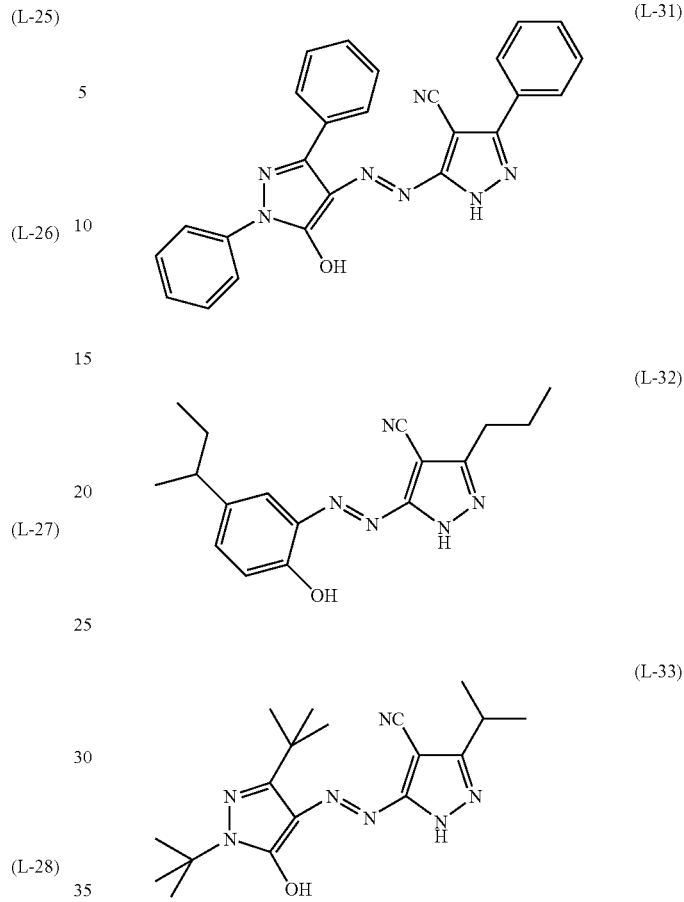

Based on differences in the environment that are present (such as being dissolved in solvent or being in a powder state), the azo metal complex dye in the present invention may have different coordination structures and/or the different valence of the metal ions. When the coordination structure differs, possible coordination structures include a five-nucleus complex comprised of five transition metal ions and four azo dyes and a two-nucleus complex comprised of two transition metal ions and two azo dyes. Cases where these coordination structures are present in mixed form are also conceivable. Since the charge and number of paired salts may also change when the valence of the metal ions changes, the paired salts of metal chelate dyes of azo dyes and transition metal ions are not specifically limited; it suffices to form paired salts with ions neutralizing the charge. Examples of ions forming paired salts are the ions given by way of example as the ion denoted by G in general formula (F), described further below. However, this is not by way of limitation.

The methods described in Japanese Unexamined Patent Publication (KOKAI) Showa No. 61-36362 and Japanese Unexamined Patent Publication (KOKAI) No. 2006-57076, which are expressly incorporated herein by reference in their entirety, are examples of common methods of synthesizing the azo dye denoted by general formula (1). However, there is no limitation to these methods; other reaction solvents and acids may be employed, and the coupling reaction may be conducted in the presence of a base (such as sodium acetate, pyridine, or sodium hydroxide). Specific examples of methods of synthesizing the azo dye are given below.

General formula (1)

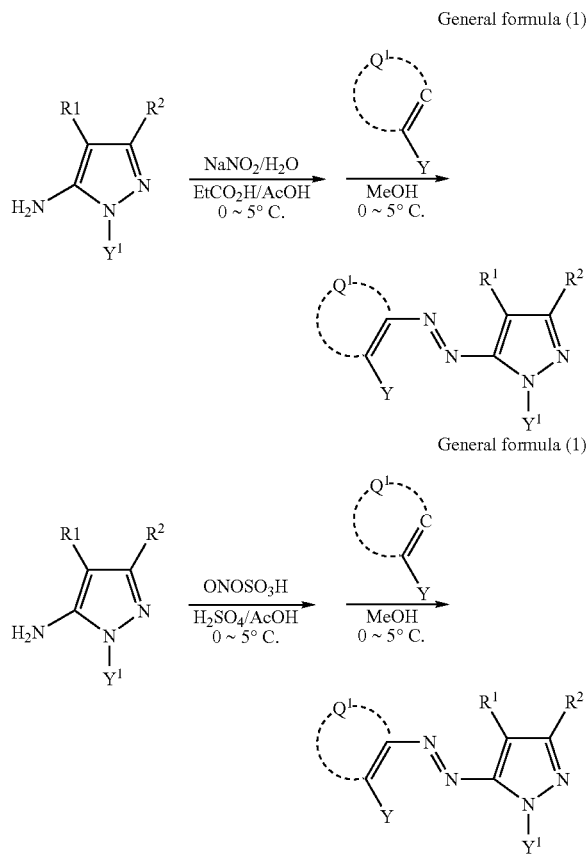

One example of a common method of obtaining a metal azo chelate dye by reacting an azo dye and a transition metal ion is to stir an azo dye and a metal salt (including a metal complex or a metal oxide salt) in an organic solvent, water, or a mixed solution thereof. When synthesizing the azo metal complex dye employed in the present invention, to obtain an azo metal complex dye comprising two or more transition metal ions per molecule, the reaction is preferably conducted in the presence of a base. The azo metal complex dye comprising the azo dye denoted by general formula (1) as a ligand is preferably obtained by reacting the azo dye denoted by general formula (1) with a transition metal ion in the presence of a base. A recording layer comprising the azo metal complex dye thus obtained will normally contain the base in the azo metal complex and/or recording layer.

The azo metal complex dye denoted by general formula (F) or (H) below is preferable as the azo metal complex dye obtained by reacting the azo dye denoted by general formula (1) and a transition metal ion. The azo metal complex dye denoted by general formula (F) is comprised of five copper ions and four of the azo dyes denoted by general formula (1). In both general formula (F) and (H), transition metal ions are bound to each of two nitrogen atoms on the pyrazole ring shown in general formula (A). These structures are thought to be stabilized by dissociation of the hydrogen atom denoted by $Y^1$.

General formula (F) will be described below.

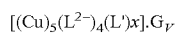 General formula (F)

In general formula (F), $L^{2-}$ denotes a divalent anion in which two hydrogen atoms have been dissociated from the azo dye denoted by general formula (2), G denotes an ion neutralizing a charge, v denotes an integer ranging from 0 to 2, L' denotes a ligand, and x denotes an integer ranging from 0 to 6.

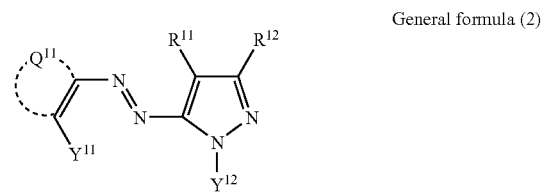

General formula (2)

In general formula (2), $Y^{11}$ denotes a group comprising one of the two hydrogen atoms, $Y^{12}$ denotes the other hydrogen atom of the above two hydrogen atoms, $R^{11}$ denotes a substituted or unsubstituted alkyloxycarbonyl group having 2 to 10 carbon atoms or a cyano group, the following partial structure:

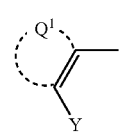

denotes the following partial structural formula (E-1) to (E-6) or (E-8).

 (E-1)

 (E-2)

 (E-3)

 (E-4)

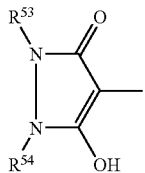
(E-5)

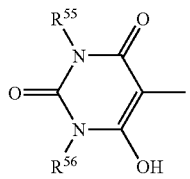
(E-6)

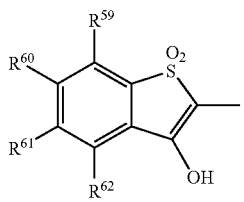
(E-8)

In the above, $R^{41}$ to $R^{56}$ and $R^{59}$ to $R^{62}$ each independently denote a hydrogen atom or a substituent, the subsubstituent may bond with an adjacent substituent to form a ring, and when $R^{46}$ to $R^{49}$ each independently denote a substituent, the substituent is a substituent other than an amino group, a hydroxyl group, an alkoxy group, and an aryloxy group.

In general formula (F), L' denotes a ligand. In the present invention, the term "ligand" means an atom, or group of atoms, capable of bonding with a metal ion. When plural ligands L' are present, they may be identical or different from each other.

Examples of the ligand denoted by L', in addition to the ligands given as preferable examples further below, are the ligands described in "Photochemistry and Photophysics of Coordination Compounds," Springer-Verlag, H. Yersin, 1987, and "Organic Metal Compounds—Foundations and Applications," Shokabo K. K., Akio Yamamoto, 1982, which are expressly incorporated herein by reference in their entirety. Specific examples of ligands will be described below.

The atoms contained in L' that coordinate to metal ions are preferably nitrogen atoms, oxygen atoms, sulfur atoms, phosphorus atoms, and halogen atoms (such as chlorine atom, fluorine atom, bromine atom, and iodine atom); more preferably nitrogen atoms, oxygen atoms, and halogen atoms; more further preferably nitrogen atoms and oxygen atoms; and still more preferably, nitrogen atoms.

When L' is coordinated to a metal ion, L' may be either an anionic ligand or a neutral ligand.

Among the above, there is no limitation for L' coordinating to a metal ion through a nitrogen atom; examples are: nitrogen-containing aromatic heterocyclic ligands (such as pyridine ligands, pyrazine ligands, pyrimidine ligands, pyridazine ligands, triazine ligands, thiazole ligands, oxazole ligands, pyrrole ligands, imidazole ligands, pyrazole ligands, triazole ligands, oxadiazole ligands, thiadiazole ligands, condensed ligands containing the same (such as quinoline ligands, benzooxazole ligands, and benzimidazole ligands), and their tautomers); amine ligands (such as ammonia, methylamine, dimethylamine, diethylamine, dibenzylamine, triethylamine, piperidine, piperazine, morpholine, and arylamine); aniline ligands (such as aniline, N-methylaniline, N,N-dimethylaniline, N,N-diethylaniline, diphenylamine, N-acylaniline, and N-alkylsulfonylaniline); imine ligands; nitrile ligands (such as acetonitrile ligands); isonitrile ligands (such as t-butylisonitrile ligands), amide ligands (such as dimethylformamide ligands and dimethylacetamide ligands); amidine ligands (such as DBU and DBN); and guanidine ligands (such as tetramethylguanidine). The ligands may comprise substituents.

There is no limitation for L' coordinating to a metal ion through an oxygen atom; examples are: alcohol ligands (preferably having 1 to 30 carbon atoms, more preferably 1 to 20 carbon atoms, still more preferably 1 to 10 carbon atoms, such as methanol, ethanol, butanol, 2-ethylhexyloxy, and other monovalent anionic ligands from which a proton has been dissociated); aryloxy ligands (preferably having 6 to 30 carbon atoms, more preferably 6 to 20 carbon atoms, still more preferably 6 to 12 carbon atoms, such as phenol, 1-naphthol, 2-naphthol, and other monovalent anionic ligands from which a proton has been dissociated); diketone ligands (such as acetylacetone ligands); silyloxy ligands (preferably having 3 to 40 carbon atoms, more preferably 3 to 30 carbon atoms, still more preferably 3 to 24 carbon atoms, such as trimethylsilyloxy and triphenylsilyl oxy); ether ligands (including cyclic ethers); carboxylic acid ligands; sulfonic acid ligands; aqua ligands; and $O_2$ ligands. These ligands may comprise substituents.

There is no limitation for L' coordinating to a metal ion through a sulfur atom; examples are: alkylthiol ligands (preferably having 1 to 30 carbon atoms, more preferably 1 to 20 carbon atoms, still more preferably 1 to 12 carbon atoms, such as butanethiol and other monovalent anionic ligands from which a proton has been dissociated); arylthiol ligands (preferably having 6 to 30 carbon atoms, more preferably 6 to 20 carbon atoms, still more preferably 6 to 12 carbon atoms, such as thiophenol); and thioether ligands. These ligands may comprise substituents.

There is no limitation for L' coordinating to the metal ion through a phosphorus atom; examples are: alkylphosphine ligands (preferably having 2 to 30 carbon atoms, more preferably 2 to 20 carbon atoms, still more preferably 2 to 10 carbon atoms, such as methylphosphine, dimethylphosphine, diethylphosphine, and dibenzylphosphine); and arylphosphine ligands (preferably having 3 to 30 carbon atoms, more preferably 4 to 20 carbon atoms, still more preferably 5 to 10 carbon atoms, such as phenylphosphine, diphenylphosphine, and pyridylphosphine). These ligands may comprise substituents.

In general formula (F), $L^{2-}$ denotes a divalent anion in which two hydrogen atoms have been dissociated from the azo dye denoted by general formula (2).

General formula (2)

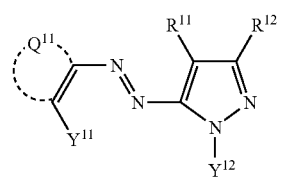

In general formula (2), $Y^{11}$ denotes a group comprising one of the above two hydrogen atoms to be dissociated, and $Y^{12}$ denotes the other hydrogen atom of the above two hydrogen atoms to be dissociated. The details of $Y^{11}$ are the same as for $Y^1$ in general formula (1).

$R^{11}$ denotes a substituted or unsubstituted alkyloxycarbonyl group having 2 to 10 carbon atoms or a cyano group, and $R^{12}$ denotes a hydrogen atom or a substituent. From the perspective of recording characteristics, $R^{11}$ preferably denotes a cyano group. From the perspective of solubility, $R^{12}$ preferably denotes a substituent. The details of these groups are as set forth above for $R^1$ and $R^2$ in general formula (1).

In general formula (2), the following partial structure:

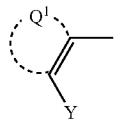

denotes the above-described partial structural formula (E-1) to (E-6) or (E-8). The details of (E-1) to (E-6) and (E-8) are as set forth above.

In general formula (F), G denotes an ion neutralizing a charge, v denotes an integer ranging from 0 to 2.

G can change with the change in valence of Cu. When all of Cu are present in the form of divalent cations, the paired anions in the Cu salt that is a starting material in synthesis of the azo metal complex can become G. Examples of G are: acetic acid anions, anions in the form of acetylacetone from which a hydrogen atom has been dissociated, halogen ions, sulfuric acid ions, nitric acid ions, and hydroxide ions. Depending on the environment in which it is present, Cu can be stable when monovalent; in such cases, it is also conceivable for G to become a cation. Examples of cations are those in which the base employed during synthesis is protonated, and the like. The base is preferably an organic base, examples of which are: primary to tertiary amines having 1 to 30 carbon atoms (such as triethylamine, diisopropylamine, pyrrolidine, N-methylpyrrolidine, and n-butylamine); amidines (such as DBU (1,8-diazabicyclo[5.4.0]-7-undecene) and DBN (1,5-diazabicyclo[4.3.0]-5-nonene); guanidines (such as tetramethylguanidine); nitrogen-containing heterocycles (such as pyridine and imidazole); and tetrabutylammoniumhydroxide. The organic solvent is preferably a primary to tertiary amine having 1 to 30 carbon atoms, more preferably a primary to tertiary amine having 1 to 20 carbon atoms, further preferably a primary to tertiary amine having 1 to 10 carbon atoms, and still more preferably, a secondary or tertiary amine having 1 to 10 carbon atoms.

When all of the Cu is present in divalent form, v becomes 2, and when Cu is present in monovalent form, v can be thought of as being an integer ranging from 0 to 2

In general formula (F), x denotes an integer ranging from 0 to 6. From the perspective of recording characteristics, x preferably denotes an integer ranging from 0 to 4, more preferably denotes an integer ranging from 0 to 3, further preferably denotes an integer ranging from 0 to 2, and still more preferably, denotes 0 or 1. This is because the smaller x becomes, the greater the content of azo ligands per molecule and the better the recording sensitivity that can be anticipated.

In the azo metal complex dye denoted by general formula (F), the azo ligand is present as a bivalent anion as indicated below. However, there is no limitation that the two anions on the ligand be localized as indicated below; the case where they are not localized is also covered.

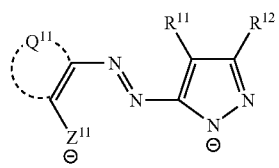

In the above, $Z^{11}$ is a group in which a hydrogen atom has been dissociated from $Y^{11}$ in general formula (2), and $R^{11}$ and $R^{12}$ are defined as in general formula (2).

In this context, a description will be given of the structure, as clarified by X-ray structural analysis, of the azo metal complex obtained by reacting a compound (A-0) that is an analog of the azo metal complex dye denoted by general formula (F) with a copper ion in the presence of triethylamine.

When compound (A-0) forms a metal complex with copper ions, in the structure of compound (A-0) as a ligand, the copper ions bond with compound (A-1) at positions (1) to (3), indicated by arrows. When this ligand forms a complex with copper ions, a metal chelate in which five copper ions are bound to four ligands is formed. The five copper ions will be referred to as the first through fifth copper ions and the four ligands as ligands 1 to 4. Above-mentioned positions (1) to (3), with respect to ligand 1, will be referred to as ligand 1(1) to ligand 1(3), and with respect to ligand 2, as ligand 2(1) to ligand 2(3). Using this nomenclature, the structure was found to be one in which ligand 1(1) and ligand 2(2) were bound to the first copper ion, ligand 1(2) and ligand 3(1) were bound to the second copper ion, ligand 2(1) and ligand 4(2) were bound to the third copper ion, ligand 3(2) and ligand 4(1) were bound to the fourth copper ion, and ligand 1(3), ligand 2(3), ligand 3(3), and ligand 4(3) were bound to the fifth copper ion positioned in the center and surrounded by the first through fourth copper ions, in the metal chelate.

The coordination structure of an azo metal complex falling under general formula (F) can be a coordination structure similar to the above coordination structure. However, the constituent elements within the molecule are not limited to azo dyes and transition metal ions, but include cases in which additional types of anions, cations, solvent molecules, and bases are also present.

Compound (A-0)

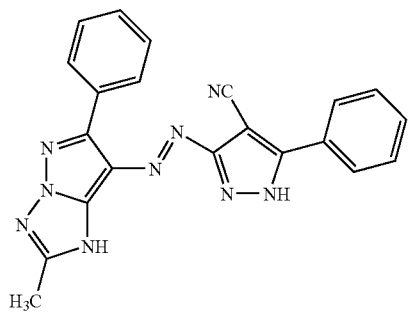

-continued

Compound (A-1)

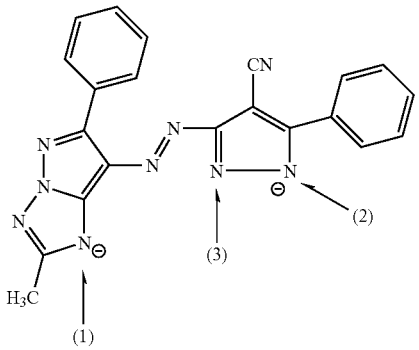

When an azo metal complex obtained by reacting compound (A-0) and copper ions in the presence of triethylamine and the similarly synthesized azo metal complex of the present invention are identified by various forms of MS (mass spectrometry), there are cases, when a molecular weight of the molecule comprised of four molecules of azo ligand and five molecules of transition metal is referred to as "M", where M peaks are detected, cases where M/2 peaks are detected as negative, cases where peaks corresponding to molecules comprised of two azo dyes and two transition metal ions are detected, and cases where peaks corresponding to molecules comprised of two azo dyes and three transition metal ions are detected. Base units can also be detected. Monodentate ligands (bases, solvent, and the like) almost never form complexes that are detected; they are usually detected as fragments. The fact that the weight reduction starting temperature of the azo metal complex will be higher than the boiling points of the base and solvent, and the like make it possible to confirm by thermal analysis (such as TG/DTA) that a base or the like has been incorporated as part of a complex.

Additionally, even when the peak of a molecule comprised of two azo dyes and two transition metal ions is detected by MS, when the copper content is analyzed by ICP (inductively-coupled plasma) or the like, there are cases where the copper content analyzed corresponds to that of a molecule comprising 0 to several bases in addition to four azo dyes and five transition metal ions. There are also cases where the copper content analyzed corresponds to that of a molecule comprising 0 to several bases in addition to two azo dyes and two transition metal ions. In identification by ESI (electrospray ionization)-MS and MALDI (matrix-assisted laser desorption/ionization)-MS, azo metal complexes of four azo dyes and five transition metal ions are often detected as fragments of two azo dyes and two transition metal ions, and two azo dyes and three transition metal ions. The azo metal complex dye comprised in the recording layer of the optical information recording medium of the present invention comprises two or more transition metal ions per molecule. Examples of preferable embodiments are given below:
(1) an embodiment that exhibits a result indicating that two azo dyes and two transition metal ions are comprised per molecule by at least one analysis selected from the group consisting of ESI-MS, MALDI-MS, and X-ray structural analysis; and
(2) an embodiment that exhibits a result indicating that four azo dyes and five transition metal ions are comprised per molecule by at least one analysis selected from the group consisting of ESI-MS, MALDI-MS, and X-ray structural analysis.

There are also cases where various types of MS and measurement of the copper content both identify the azo metal complex dye as a molecule comprised of two azo dyes and two transition metal ions. Such azo metal complex dyes are preferably the azo metal complex dye denoted by general formula (H) below. The presence of the structure denoted by general formula (H) can be confirmed by X-ray structural analysis.

General formula (H) will be described below. In the present invention, a solid line connecting two atoms in a structural formula denotes a covalent bond, and a dotted line indicates a coordination bond.

General formula (H)

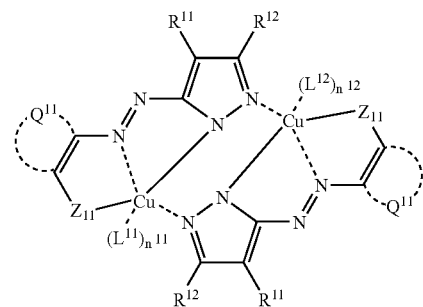

In general formula (H), $Z^{11}$ denotes a group in which a hydrogen atom has been dissociated from $Y^{11}$ in the following partial structure.

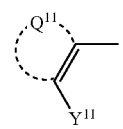

In the above partial structure, $R^{11}$ and $R^{12}$ are defined respectively as in general formula (F), and the details are as set forth above. In general formula (H), two $Q^{11}$s, two $Z^{11}$s, two $R^{11}$s, and two $R^{12}$s present may be respectively identical or different from each other.

$L^{11}$ and $L^{12}$ each independently denote a ligand. $L^{11}$ and $L^{12}$ are each defined identically with L' above, and details such as preferable embodiments and the like are also identical thereto.

$n^{11}$ and $n^{12}$ each independently denote an integer ranging from 0 to 2. When plural $L^{11}$s are present, the plural $L^{11}$s may be identical or different from each other, and when plural $L^{12}$s are present, the plural $L^{12}$s may be identical or different from each other.

In general formula (F), it is preferable for $R^{11}$ to be a cyano group, for $R^{12}$ to be a substituted or unsubstituted alkyl group having 1 to 4 carbon atoms, for the partial structure given below:

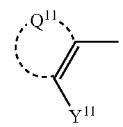

to be one from among (E-1) to (E-3) and (E-8), and for L' to be an organic base. It is more preferable for $R^{11}$ to be a cyano group, for $R^{12}$ to be a substituted or unsubstituted alkyl group having 2 to 4 carbon atoms, for the partial structure given below:

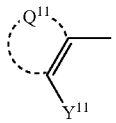

to be one from among (E-1), (E-3), and (E-8), and for L' to be an organic base. It is further preferable for $R^{11}$ to be a cyano group, for $R^{12}$ to be a substituted or unsubstituted alkyl group having 2 or 3 carbon atoms, for the partial structure given below:

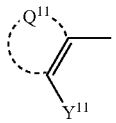

to be either (E-1) or (E-3), and for L' to be an organic base. It is even more preferable for $R^{11}$ to be a cyano group, for $R^{12}$ to be a substituted or unsubstituted allyl group having 3 or 4 carbon atoms, for the partial structure given below:

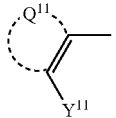

to be either (E-1) or (E-3).

In general formula (H), it is preferable for $R^{11}$ to be a cyano group, for $R^{12}$ to be a substituted or unsubstituted alkyl group having 1 to 4 carbon atoms, for the partial structure given below:

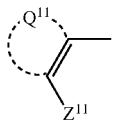

to be one from among (E-1) to (E-3) and (E-8) in which one of the hydrogen atoms contained in the $Y^{11}$ moiety has been dissociated, and for L' to be an organic base. It is more preferable for $R^{11}$ to be a cyano group, for $R^{12}$ to be a substituted or unsubstituted alkyl group having 2 to 4 carbon atoms, for the partial structure given below:

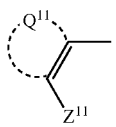

to be one from among (E-1), (E-3) and (E-8) in which one of the hydrogen atoms contained in the $Y^{11}$ moiety has been dissociated, and for L' to be an organic base. It is further preferable for $R^{11}$ to be a cyano group, for $R^{12}$ to be a substituted or unsubstituted alkyl group having 2 to 3 carbon atoms, for the partial structure given below:

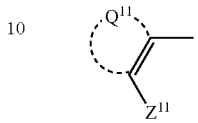

to be either (E-1) or (E-3) in which one of the hydrogen atoms contained in the $Y^{11}$ moiety has been dissociated, and for L' to be an organic base. It is even more preferable for the above partial structure comprising $Q^{11}$ and $Z^{11}$ to be either (E-1), (E-3), or (E-8) in which one of the hydrogen atoms contained in the $Y^{11}$ moiety has been dissociated. And it is still more preferable for it to be either (E-1) or (E-8) in which one of the hydrogen atoms contained in the $Y^{11}$ moiety has been dissociated.

As a specific example of general formula (H), compound (M-35), described further below, was determined based on the results of X-ray structural analysis to have the structural formula indicated below. To manufacture single crystals, (M-35) was dissolved in DMAc and maintained for an extended period in a methanol atmosphere. Although this compound exhibited both peaks corresponding to general formula (F) and peaks matching the following structure in ESI-MS, identification as the following structure was possible based on the results of X-ray structural analysis. The single crystals and the powder used to produce the single crystals had matching absorption spectrum waveforms in chloroform.

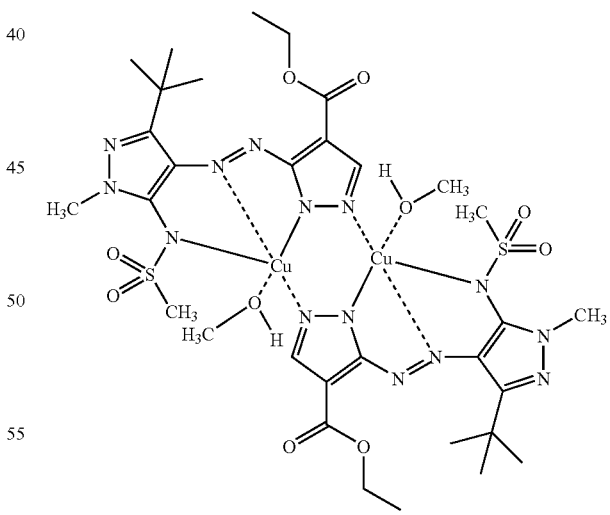

The azo metal complex dye denoted by general formula (F) or (H) can be obtained by reacting the azo dye denoted by general formula (1) with copper salt. The reaction is preferably conducted in the presence of a base, and the base employed is preferably an organic base. This is because the metal ions in the base form ion pairs with the azo ligands when employing an inorganic base, making it difficult to obtain the desired azo metal complex. Examples of organic bases are the above-described organic bases. An alcohol such as methanol can be employed as the solvent, for example. Since the ligand denoted by $L^{11}$ in general formula (F) and the ligand denoted by $L^{11}$ or $L^{12}$ in general formula (H) is derived from the base or from the solvent, an azo metal complex dye having desired ligands can be obtained through the selection of the base and the solvent. In the present invention, neither the type of metal salt, the type of base, the type of organic solvent or mixture thereof, nor the reaction temperature or the like is limited. It suffices to suitably set, the concentration and the mixing proportions of azo dye and metal salt in the reaction solution, as well as reaction conditions such as the reaction temperature and the reaction time. A known method such as ESI-MS, MALDI-MS, ESR (electron spin resonance), X-ray structural analysis, or ICP can be used to confirm that the targeted azo metal complex dye has been obtained. Whether the azo metal complex dye denoted by general formula (F) or by general formula (H) is produced depends on the type of azo ligand. Both afford good recording and reproduction characteristics, light resistance, and reproduction durability when irradiated with a recording short-wavelength laser beam.

Specific examples of the azo metal complex dye denoted by general formula (F) and (H) are given below. However, the present invention is not limited to the specific examples below. For the reasons stated above, the compounds in the specific examples given below may have the structure of either one, or both, of general formulas (F) and (H).

TABLE 1

| Example compound | derivation of $L^{2-}$ (azo dye employed) | Starting material of transition metal ion | Base employed |
| --- | --- | --- | --- |
| Compound (M-1) | (L-1) | $Cu(CH3COO)_2 \cdot H_2O$ | $Et_3N$ |
| Compound (M-2) | (L-2) | $Cu(CH3COO)_2 \cdot H_2O$ | $Et_3N$ |
| Compound (M-3) | (L-3) | $Cu(CH3COO)_2 \cdot H_2O$ | $Et_3N$ |
| Compound (M-4) | (L-4) | $Cu(CH3COO)_2 \cdot H_2O$ | $Et_3N$ |
| Compound (M-5) | (L-5) | $Cu(CH3COO)_2 \cdot H_2O$ | $Et_3N$ |
| Compound (M-6) | (L-6) | $Cu(CH3COO)_2 \cdot H_2O$ | $Et_3N$ |
| Compound (M-7) | (L-7) | $Cu(CH3COO)_2 \cdot H_2O$ | $Et_3N$ |
| Compound (M-8) | (L-8) | $Cu(CH3COO)_2 \cdot H_2O$ | DBU |
| Compound (M-9) | (L-9) | $Cu(CH3COO)_2 \cdot H_2O$ | $Et_3N$ |
| Compound (M-10) | (L-10) | $Cu(CH3COO)_2 \cdot H_2O$ | DBU |
| Compound (M-11) | (L-11) | $Cu(CH3COO)_2 \cdot H_2O$ | DBU |
| Compound (M-12) | (L-12) | $Cu(CH3COO)_2 \cdot H_2O$ | DBU |
| Compound (M-13) | (L-13) | $Cu(CH3COO)_2 \cdot H_2O$ | DBU |
| Compound (M-14) | (L-14) | $Cu(CH3COO)_2 \cdot H_2O$ | DBU |
| Compound (M-15) | (L-15) | $Cu(CH3COO)_2 \cdot H_2O$ | $Et_3N$ |
| Compound (M-16) | (L-16) | $Cu(CH3COO)_2 \cdot H_2O$ | $iPr_2NH$ |
| Compound (M-17) | (L-17) | $Cu(CH3COO)_2 \cdot H_2O$ | DBU |
| Compound (M-18) | (L-18) | $Cu(CH3COO)_2 \cdot H_2O$ | $Et_3N$ |
| Compound (M-19) | (L-20) | $Cu(CH3COO)_2 \cdot H_2O$ | DBU |
| Compound (M-20) | (L-23) | $Cu(CH3COO)_2 \cdot H_2O$ | DBU |

TABLE 2

| Example compound | derivation of $L^{2-}$ (azo dye employed) | Starting material of transition metal ion | Base employed |
| --- | --- | --- | --- |
| Compound (M-21) | (L-1) | $Cu(CH3COO)_2 \cdot H_2O$ | DBU |
| Compound (M-22) | (L-1) | $Cu(CH3COO)_2 \cdot H_2O$ | $^nPr_2NH$ |
| Compound (M-23) | (L-1) | $Cu(CH3COO)_2 \cdot H_2O$ | Pyrrolidine |
| Compound (M-24) | (L-1) | $CuSO_4 \cdot 5H_2O$ | $Et_3N$ |
| Compound (M-25) | (L-1) | $CuCl_2 \cdot 2H_2O$ | $Et_3N$ |
| Compound (M-26) | (L-9) | $Cu(CH3COO)_2 \cdot H_2O$ | DBU |
| Compound (M-27) | (L-11) | $Cu(CH3COO)_2 \cdot H_2O$ | $^iPr_2NH$ |
| Compound (M-28) | (L-14) | $Cu(CH3COO)_2 \cdot H_2O$ | $Et_3N$ |
| Compound (M-29) | (L-14) | $Cu(CH3COO)_2 \cdot H_2O$ | $^iPr_2NH$ |
| Compound (M-30) | (L-14) | $Cu(CH3COO)_2 \cdot H_2O$ | Pyrrolidine |
| Compound (M-31) | (L-15) | $Cu(CH3COO)_2 \cdot H_2O$ | DBU |
| Compound (M-32) | (L-15) | $Cu(CH3COO)_2 \cdot H_2O$ | $^iPr_2NH$ |
| Compound (M-33) | (L-15) | $Cu(CH3COO)_2 \cdot H_2O$ | Pyrrolidine |
| Compound (M-34) | (L-17) | $Cu(CH3COO)_2 \cdot H_2O$ | DBU |
| Compound (M-35) | (L-22) | $Cu(CH3COO)_2 \cdot H_2O$ | DBU |
| Compound (M-36) | (L-23) | $Cu(CH3COO)_2 \cdot H_2O$ | $Et_3N$ |
| Compound (M-37) | (L-24) | $Cu(CH3COO)_2 \cdot H_2O$ | DBN |
| Compound (M-38) | (L-31) | $Cu(CH3COO)_2 \cdot H_2O$ | DBU |
| Compound (M-39) | (L-32) | $Cu(CH3COO)_2 \cdot H_2O$ | $Et_3N$ |
| Compound (M-40) | (L-33) | $Cu(CH3COO)_2 \cdot H_2O$ | $Et_3N$ |

The optical information recording medium of the present invention comprises at least one azo metal complex dye described above in the recording layer, and may comprise one, two, or more of the azo metal complex dye in the recording layer. The content of the azo metal complex dye in the recording layer can fall within a range of 1 to 100 weight percent, preferably falls within a range of 70 to 100 weight percent, more preferably falls within a range of 80 to 100 weight percent, and still more preferably, falls within a range of 90 to 100 weight percent of the total weight of the recording layer.

It suffices for the optical information recording medium of the present invention to have at least one recording layer on the support (on a surface having pregrooves with a track pitch of 50 to 500 nm), but it may have two or more such recording layers. One or more recording layers other than recording layers comprising the above azo metal complex dye may also be present. When the recording layer comprising the above azo metal complex dye further comprises other recording dyes, the proportion of the azo metal complex dye to the total dye component is preferably 70 to 100 weight percent, more preferably 80 to 100 weight percent.

When employing dyes other than the above azo metal complex dye as dye components in the present invention, these dyes preferably have absorption in the short wavelength region of equal to or shorter than 440 nm, for example. Such dyes are not specifically limited; examples are azo dyes, azo metal complex dyes, phthalocyanine dyes, oxonol dyes, cyanine dyes, and squarylium dyes.

In the optical information recording medium of the present invention, the recording layer comprising the azo metal complex dye is a layer permitting the recording of information by irradiation of a laser beam. The phrase "permitting the recording of information by irradiation of a laser beam" means that the optical characteristics of portions of the recording layer that are irradiated with a laser beam change. The change in optical characteristics is thought to occur when a laser beam is directed onto the recording layer and the irradiated portions absorb the beam, causing the temperature to rise locally and producing a physical or chemical change (such as generating a pit). Reading (reproduction) of information that has been recorded on the recording layer can be achieved by irradiating a laser beam of the same wavelength as that employed in recording, for example, and detecting the difference in optical characteristics, such as the refractive index, between portions where the optical characteristics of the recording layer have been changed (recorded portions) and portions where they have not (unrecorded portions). The above-described azo metal complex dye absorbs laser beams of equal to or shorter than 440 nm, for example. The optical information recording medium of the present invention, which comprises a recording layer comprising the metal complex compound having absorption in the short wavelength region in this manner is suitable as a large-capacity optical disk permitting recording by a short-wavelength laser, such as an optical disk of the Blu-ray type that employs a blue laser of 405 nm. The method for recording information on the optical information recording medium of the present invention will be described further below.

The optical information recording medium of the present invention comprises at least the above-described recording layer comprising the azo metal complex dye on a support, and may further comprise a light reflective layer, a protective layer, and the like in addition to the above-described recording layer.

Any of the various materials conventionally employed as support materials for optical information recording media may be selected for use as the support employed in the present invention. A transparent disk-shaped support is preferably employed as the support.

Specific examples are glass, acrylic resins such as polycarbonate and polymethyl methacrylate, vinyl chloride resins such as polyvinyl chloride and vinyl chloride copolymers, epoxy resins, amorphous polyolefins, polyesters, and metals such as aluminum. They may be employed in combination as desired.

Of the above materials, thermoplastic resins such as amorphous polyolefins and polycarbonates are preferable, and polycarbonates are particularly preferable, from the perspectives of resistance to humidity, dimensional stability, low cost, and the like. When employing these resins, the support can be manufactured by injection molding.

The thickness of the support generally falls within a range of 0.7 to 2 mm, preferably a range of 0.9 to 1.6 mm, and more preferably, within a range of 1.0 to 1.3 mm.

To enhance smoothness and increase adhesive strength, an undercoating layer can be formed on the surface of the support on the side on which the light reflective layer, described further below, is positioned.

Tracking guide grooves or irregularities (pregrooves) denoting information such as address signals are formed on the surface of the support on which the recording layer is formed. The track pitch of these pregrooves falls within a range of 50 to 500 nm. When the track pitch is equal to or greater than 50 nm, not only is it possible to correctly form the pregrooves, but the generation of crosstalk can be avoided. At equal to or less than 500 nm, high-density recording is possible. A support on which a narrower track pitch than that employed in CD-Rs and DVD-Rs is formed to achieve a higher recording density is employed in the optical information recording medium of the present invention. The preferable range of the track pitch will be described in detail further below.

An optical information recording medium (referred to as "Embodiment (1)" hereinafter) sequentially comprising, from the support side, a support 0.7 to 2 mm in thickness, a dye-containing recordable layer, and a cover layer 0.01 to 0.5 mm in thickness is an example of a preferable embodiment of the optical information recording medium of the present invention.

In Embodiment (1), it is preferable for the pregrooves formed on the support to be 50 to 500 nm in the track pitch, 25 to 250 nm in the groove width, and 5 to 150 nm in the groove depth.

Optical information recording medium of Embodiment (1) will be described in detail below. However, the present invention is not limited to Embodiment (1).

Optical Information Recording Medium of Embodiment (1)

The optical information recording medium of Embodiment (1) comprises at least a support, a recordable layer, and a protective layer (cover layer). The optical information recording medium of Embodiment (1) is suitable as a Blu-ray type recording medium. In the Blu-ray system, information is recorded and reproduced by irradiation of a laser beam from the cover layer side, and a light reflective layer is normally provided between the support and the recording layer.

FIG. 1 shows an example of an optical information recording medium of Embodiment (1). The first optical information recording medium 10A shown in FIG. 1 is comprised of first light reflective layer 18, first recordable layer 14, barrier layer 20, first bonding layer or first adhesive layer 22, and cover layer 16, in that order on first support 12

These materials constituting these components will be sequentially described below Support On the support of Embodiment (1) are formed pregrooves (guide grooves) having a shape such that the track pitch, groove width (half width), groove depth, and wobble amplitude all fall within the ranges given below. The pregrooves are provided to achieve a recording density greater than that of CD-Rs and DVD-Rs. For example, the optical information recording medium of the present invention is suited to use as a medium for blue-violet lasers.

The track pitch of the pregrooves ranges from 50 to 500 nm. When the track pitch is equal to or greater than 50 nm, not only is it possible to correctly form the pregrooves, but the generation of crosstalk can be avoided. At equal to or less than 500 nm, high-density recording is possible. The rack pitch of the pregrooves is preferably ranges from 100 nm to 420 nm, more preferably from 200 nm to 370 nm, and further preferably from 260 nm to 330 nm.

The groove width (half width) of the pregrooves ranges from 25 to 250 nm, preferably from 50 to 240 nm, more preferably from 80 to 230 nm, and further preferably from 100 to 220 nm. A pregroove width of equal to or higher than 25 nm can permit adequate transfer of the grooves during molding and can inhibit a rise in the error rate during recording. A groove width of equal to or lower than 250 nm can also permit adequate transfer of grooves during molding and can avoid crosstalk due to the widening of bits formed during recording.

The groove depth of the pregrooves ranges from 5 to 150 nm. Pregrooves that are equal to or greater 5 nm in depth can permit an adequate degree of recording modulation, and a depth of equal to or less than 150 nm can permit the achieving of high reflectance. The groove depth of the pregrooves preferably ranges from 10 to 85 nm, more preferably from 20 to 80 nm, and further preferably from 28 to 75 nm.

The upper limit of the groove tilt angle of the pregrooves is preferably equal to or less than 80°, more preferably equal to or less than 75°, further preferably equal to or less than 70°, and still more preferably, equal to or less than 65°. The lower limit is preferably equal to or greater than 20°, more preferably equal to or greater than 30°, and still more preferably, equal to or greater than 40°.

When the groove tilt angle of the pregrooves is equal to or greater than 20°, an adequate tracking error signal amplitude can be achieved, and at equal to or less than 80°, shaping properties are good.

Recordable Layer

The recordable layer of Embodiment (1) can be formed by preparing a coating liquid by dissolving the dye in a suitable solvent with or without the use of a binder or the like, coating this coating liquid on the support or on a light reflective layer, described further below, to form a coating, and then drying the coating. The recordable layer may comprise a single layer or multiple layers. When the structure is multilayer, the step of coating the coating liquid may be conducted multiple times.

The concentration of dye in the coating liquid generally ranges from 0.01 to 15 weight percent, preferably ranges from 0.1 to 10 weight percent, more preferably ranges from 0.5 to 5 weight percent, and still more preferably, ranges from 0.5 to 3 weight percent.

Examples of the solvent employed in preparing the coating liquid are: esters such as butyl acetate, ethyl lactate, and Cellosolve acetate; ketones such as methyl ethyl ketone, cyclohexanone, and methyl isobutyl ketone; chlorinated hydrocarbons such as dichloromethane, 1,2-dichloroethane, and chloroform; amides such as dimethylformamide; hydrocarbons such as methylcyclohexane; ethers such as tetrahydrofuran, ethyl ether, and dioxane; alcohols such as ethanol, n-propanol, isopropanol, and n-butanol diacetone alcohol; fluorine solvents such as 2,2,3,3-tetrafluoro-1-propanol; and glycol ethers such as ethylene glycol monomethylether, ethylene glycol monoethylether, and propylene glycol monomethylether.

The solvents may be employed singly or in combinations of two or more in consideration of the solubility of the dyes employed. Binders, oxidation inhibitors, UV absorbing agents, plasticizers, lubricants, and various other additives may be added to the coating liquid as needed.

Examples of coating methods are spraying, spincoating, dipping, roll coating, blade coating, doctor roll coating, and screen printing.

During coating, the temperature of the coating liquid preferably falls within a range of 23 to 50° C., more preferably within a range of 24 to 40° C., and further preferably, within a range of 23 to 30° C.

The thickness of the recordable layer on lands (protrusions on the support) is preferably equal to or less than 300 nm, more preferably equal to or less than 250 nm, further preferably equal to or less than 200 nm, and still more preferably, equal to or less than 180 nm. The lower limit is preferably equal to or greater than 1 nm, more preferably equal to or greater than 3 nm, further preferably equal to or greater than 5 nm, and still more preferably, equal to or greater than 7 nm.

The thickness of the recordable layer on grooves (indentation in the support) is preferably equal to or less than 400 nm, more preferably equal to or less than 300 nm, and further preferably, equal to or less than 250 nm. The lower limit is preferably equal to or greater than 10 nm, more preferably equal to or greater than 20 nm, and further preferably, equal to or greater than 25 nm.

The ratio of the thickness of the recordable layer on lands to the thickness of the recordable layer on grooves (thickness on lands/thickness on grooves) is preferably equal to or greater than 1.0, more preferably equal to or greater than 0.13, further preferably equal to or greater than 0.15, and still more preferably, equal to or greater than 0.17. The upper limit is preferably equal to or less than 1, more preferably equal to or less than 0.9, further preferably equal to or less than 0.85. and still more preferably, equal to or less than 0.8.

Various antifading agents may be incorporated into the recordable recording layer to enhance the resistance to light of the recordable recording layer. Singlet oxygen quenchers are normally employed as the antifading agent. The single oxygen quencher can also be employed in the present invention to further enhance the resistance to light. Singlet oxygen quenchers that are described in known publications such as patent specifications may be employed.

Specific examples are described in Japanese Unexamined Patent Publication (KOKAI) Showa Nos. 58-175693, 59-81194, 60-18387, 60-19586, 60-19587, 60-35054, 60-36190, 60-36191, 60-44554, 60-44555, 60-44389, 60-44390, 60-54892, 60-47069, and 63-209995; Japanese Unexamined Patent Publication (KOKAI) Heisei No. 4-25492; Japanese Examined Patent Publication (KOKOKU) Heisei Nos. 1-38680 and 6-26028; German Patent No. 350399; and the Journal of the Japanese Chemical Society, October Issue, 1992, p. 1141, which are expressly incorporated herein by reference in their entirety.

The quantity of antifading agent in the form of the above singlet oxygen quencher or the like normally falls within a range of 0.1 to 50 weight percent, preferably falls within a range of 0.5 to 45 weight percent, more preferably falls within a range of 3 to 40 weight percent, and still more preferably, falls within a range of 5 to 25 weight percent, of the quantity of dye.

Cover Layer

The cover layer in embodiment (1) is normally adhered through a bonding agent or adhesive onto the above-described recordable recording layer or onto a barrier layer such as that shown in FIG. 1.

The cover layer is not specifically limited, other than that it be a film of transparent material. An acrylic resin such as a polycarbonate or polymethyl methacrylate; a vinyl chloride resin such as polyvinyl chloride or a vinyl chloride copolymer; an epoxy resin; amorphous polyolefin; polyester; or cellulose triacetate is preferably employed. Of these, the use of polycarbonate or cellulose triacetate is more preferable.

The term "transparent" means having a transmittance of equal to or greater than 80 percent for the beam used in recording and reproducing.

The cover layer may further contain various additives so long as they do not compromise the effect of the present invention. For example, UV-absorbing agents may be incorporated to cut light with the wavelength of equal to or shorter than 400 nm and/or dyes may be incorporated to cut light with the wavelength of equal to or longer than 500 nm.

As for the physical surface properties of the cover layer, both the two-dimensional roughness parameter and three-dimensional roughness parameter are preferably equal to or less than 5 nm.

From the perspective of the degree of convergence of the beam employed in recording and reproducing, the birefringence of the cover layer is preferably equal to or lower 10 nm.

The thickness of the cover layer can be suitably determined based on the NA or wavelength of the laser beam irradiated in recording and reproducing. In the present invention, the thickness preferably falls within a range of 0.01 to 0.5 mm, more preferably a range of 0.05 to 0.12 mm.

The total thickness of the cover layer and bonding or adhesive layer is preferably 0.09 to 0.11 mm, more preferably 0.095 to 0.105 mm.

A protective layer (hard coating layer 44 in the embodiment shown in FIG. 1) may be provided on the incident light surface of the cover layer during manufacturing of the optical information recording medium to prevent scratching of the incident light surface.

To bond the cover layer and the recordable layer or barrier layer, a bonding layer or an adhesive layer may be provided between the two layers.

A UV-curable resin, EB-curable resin, thermosetting resin, or the like is preferably employed as the bond in the bonding layer.

When employing a UV-curable resin as the bond, the UV-curable resin may be employed as is, or dissolved in a suitable solvent such as methyl ethyl ketone or ethyl acetate to prepare a coating liquid, which is then coated on the surface of the barrier layer with a dispenser. To prevent warping of the optical information recording medium that has been manufactured, a UV-curable resin having a low curing shrinkage rate is preferably employed in the bonding layer. Examples of such UV-curable resins are SD-640 and the like, made by Dainippon Ink and Chemicals, Inc.

The method of forming the bonding layer is not specifically limited. It is desirable to coat a prescribed quantity of bond on the surface of the barrier layer or the recordable layer (the bonded surface), dispose a cover layer thereover, uniformly spread the bond between the bonded surface and the cover layer by spin-coating or the like, and then cure the bond.

The thickness of the bonding layer preferably falls within a range of 0.1 to 100 micrometers, more preferably a range of 0.5 to 50 micrometers, and further preferably, 1 to 30 micrometers.

Examples of the adhesive employed in the adhesive layer are acrylic, rubber, and silicone adhesives. From the perspectives of transparency and durability, acrylic adhesives are preferable. Preferable acrylic adhesive is an acrylic adhesive comprising a main component in the form of 2-ethylhexyl acrylate, n-butyl acrylate, or the like copolymerized with a short-chain alkyl acrylate or methacrylate, such as methyl acrylate, ethyl acrylate, or methyl methacrylate to increase the cohesive force, and the component capable of becoming a crosslinking point with a crosslinking agent, such as acrylic acid, methacrylic acid, an acrylamide derivative, maleic acid, hydroxylethyl acrylate, or glycidyl acrylate. The type and blending ratio of the main component, short-chain component, and component for the addition of a crosslinking point can be suitably adjusted to vary the glass transition temperature (Tg) and crosslinking density. The glass transition temperature (Tg) preferably equal to or less than 0° C., more preferably equal to or less than −15° C., and further preferably, equal to or less than −25° C.

The glass transition temperature (Tg) can be measured by differential scanning calorimetry (DSC) with a DSC6200R made by Seiko Instruments, Inc.

The method described in Japanese Unexamined Patent Publication (KOKAI) No. 2003-217177, Japanese Unexamined Patent Publication (KOKAI) No. 2003-203387, Japanese Unexamined Patent Publication (KOKAI) Heisei No. 9-147418, which are expressly incorporated herein by reference in their entirety, or the like can be used to prepare the adhesive.

The method of forming the adhesive layer is not specifically limited. A prescribed quantity of adhesive can be uniformly coated on the surface of the barrier layer or recordable layer (the adhered surface), a cover layer can be disposed thereover, and the adhesive can be cured. Alternatively, a prescribed quantity of adhesive can be uniformly coated on one side of the cover layer to form a coating of adhesive, this coating can be adhered to the adhered surface, and then the adhesive can be cured.

Further, a commercial adhesive film on which an adhesive layer has been disposed in advance can be employed as the cover layer.

The thickness of the adhesive layer preferably falls within a range of 0.1 to 100 micrometers, more preferably a range of 0.5 to 50 micrometers, and further preferably, a range of 10 to 30 micrometers.

The cover layer can also be formed by spin-coating UV-curable resin.

Other Layers

The optical information recording medium of embodiment (1) may optionally comprise other layers in addition to the above-described essential layers so long as the effect of the present invention is not compromised. Examples of such optional layers are a label layer having a desired image that is formed on the back of the support (the reverse unformed side from the side on which the recordable recording layer is formed), a light reflective layer positioned between the support and the recordable recording layer (described in detail further below), a barrier layer positioned between the recordable recording layer and the cover layer (described in detail further below), and a boundary layer positioned between the above light reflective layer and the recordable recording layer. The "label layer" may be formed from UV-curing resin, thermosetting resin, or heat-drying resin.

Each of the above-described essential layers and optional layers may have a single-layer or multilayer structure.

To increase reflectance for the laser beam and impart functions that enhance recording and reproducing characteristics to the optical information recording medium of embodiment (1), a light reflective layer is preferably formed between the support and the recordable recording layer.

The reflective layer can be formed, for example, by vacuum vapor depositing, by sputtering, or by ion plating a light reflective substance with high reflectance for the laser beam on the support. The thickness of the light reflective layer can normally range from 10 to 300 nm, preferably ranges from 30 to 200 nm.

The reflectance is preferably equal to or greater than 70 percent.

Examples of light reflective substances of high reflectance are: metals and semimetals such as Mg, Se, Y, Ti, Zr, Hf, V, Nb, Ta, Cr, Mo, W, Mn, Re, Fe, Co, Ni, Ru, Rh, Pd, Ir, Pt, Cu, Ag, Au, Zn, Cd, Al, Ga, In, Si, Ge, Te, Pb, Po, Sn, and Bi; and stainless steel. These light reflective substances may be employed singly, in combinations of two or more, or as alloys. Of these, the preferable substances are: Cr, Ni, Pt, Cu, Ag, Au, Al, and stainless steel; the more preferable substances are: Au, Ag, Al, and their alloys; and the substances of greatest preference are: Au, Ag, and their alloys.

Barrier Layer (Intermediate Layer)

In the optical information recording medium of embodiment (1), as shown in FIG. 1, it is preferable to form a barrier layer between the recordable recording layer and the cover layer.

The barrier layer can be provided to enhance the storage properties of the recordable recording layer, enhance adhesion between the recordable recording layer and cover layer, adjust the reflectance, adjust thermal conductivity, and the like.

The material employed in the barrier layer is a material that passes the beam employed in recording and reproducing; it is not specifically limited beyond being able to perform this function. For example, it is generally desirable to employ a material with low permeability to gas and moisture. A material that is also a dielectric is preferred.

Specifically, materials in the form of nitrides, oxides, carbides, and sulfides of Zn, Si, Ti, Te, Sn, Mo, Ge, Nb, Ta and the like are preferable. $MoO_2$, $GeO_2$, TeO, $SiO_2$, $TiO_2$, ZuO, $SnO_2$, ZnO—$Ga_2O_3$, $Nb_2O_5$, and $Ta_2O_5$ are preferable and $SnO_2$, ZnO—$Ga_2O_3$, $SiO_2$, $Nb_2O_5$, and $Ta_2O_5$ are more preferable.

The barrier layer can be formed by vacuum film-forming methods such as vacuum vapor deposition, DC sputtering, RF sputtering, and ion plating. Of these, sputtering is preferred.

The thickness of the barrier layer preferably falls within a range of 1 to 200 nm, more preferably within a range of 2 to 100 nm, and further preferably, within a range of 3 to 50 nm.

Method of Recording Information

The present invention relates to a method of recording information on the optical information recording medium of the present invention by irradiation of a laser beam having a wavelength of equal to or shorter than 440 nm onto the recording layer comprised in the optical information recording medium.

By way of example, information is recorded on the above-described preferred optical information recording medium of embodiment (1) in the following manner.

First, while rotating an optical information recording medium at a certain linear speed (such as 0.5 to 10 m/s) or a certain angular speed, a laser beam for recording, such as a semiconductor laser beam, is directed from the protective layer side. Irradiation by this laser beam changes the optical properties of the portions that are irradiated, thereby recording information. In the embodiment shown in FIG. 1, recording laser beam 46 such as a semiconductor laser beam is directed from cover layer 16 side through first object lens 42 (having a numerical aperture NA of 0.85, for example). Irradiation by laser beam 46 causes recordable recording layer 14 to absorb laser beam 46, resulting in a local rise in temperature. This is thought to produce a physical or chemical change (such as generating pits), thereby altering the optical characteristics and recording information.

In the method of recording information of the present invention, information is recorded by irradiation of a laser beam having a wavelength of equal to or shorter than 440 nm. A semiconductor laser beam having an oscillation wavelength falling within a range of equal to or shorter than 440 nm is suitable for use as a recording beam. A blue-violet semiconductor laser beam having an oscillation wavelength falling within a range of 390 to 415 nm and a blue-violet SHG laser beam having a core oscillation wavelength of 425 nm obtained by halving the wavelength of an infrared semiconductor laser beam having a core oscillation wavelength of 850 nm with an optical waveguide device are examples of preferable light sources. In particular, a blue-violet semiconductor laser beam having an oscillation wavelength of 390 to 415 nm is preferably employed from the perspective of recording density. As described above, the optical information recording medium of Embodiment (1) comprises a reflective layer between the support and the recordable recording layer, and the laser beam is irradiated onto the recording layer from a cover layer side, that is, an opposite surface side, the opposite surface being opposite from the surface facing the reflective layer.

The information that is thus recorded can be reproduced by directing the semiconductor laser beam from the support side or protective layer side while rotating the optical information recording medium at the same constant linear speed as above, and detecting the reflected beam.

Azo Metal Complex Dye

The present invention relates to the above-described azo metal complex dye denoted by general formula (F) or (H).

The azo metal complex dye of the present invention can be employed in various uses, such as colorants, photographic materials, UV-absorbing materials, color filter dyes, and color-changing filters. It is preferably employed as a recording layer dye in optical information recording media having a dye-containing recording layer. The details of the azo metal complex dye of the present invention and the method of manufacturing it are as set forth above.

EXAMPLES

The present invention will be described in detail below based on examples. However, the present invention is not limited to the examples.

Specific examples of methods of synthesizing the azo dye denoted by general formula (1) will be described below. However, the present invention is not limited to these methods.

Synthesis of Compound (L-13)

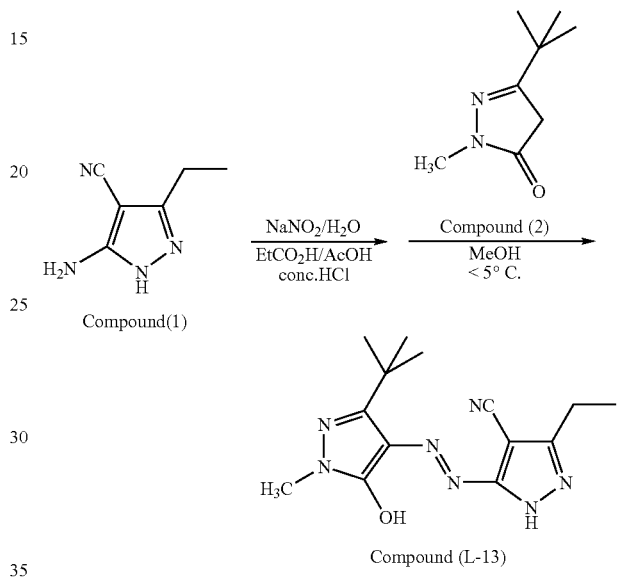

Into a 100 mL triangular flask were poured 2 mL of acetic acid and 4 mL of propionic acid, and 2.23 g of hydrochloric acid (35 to 37 percent) was gradually added dropwise with ice cooling. The mixture was cooled to 0 to 5° C. in an ice bath, an aqueous solution in which 0.52 g of $NaNO_2$ was dissolved was gradually added dropwise, and the mixture was stirred for 1 hour at 0 to 5° C. This acidic solution was gradually added to 15 mL of a methanol solution of 1.13 g of compound (2) that had been maintained at 0 to 5° C. with ice cooling, and the mixture was stirred for 1 hour. The mixture was returned to room temperature, stirred for 2 hours, and cooled in an ice bath. The precipitate was filtered out and washed with a minimal quantity of methanol and distilled water. The solid that was obtained was dried, yielding 1.13 g of compound (L-13). The compound was identified by 300 MHz $^1$H-NMR.

$^1$H-NMR (DMSO-d6) [ppm]; δ13.44 (1H, s), 3.30 (3H, s), 2.80-2.74 (2H, q), 1.33 (9H, s), 1.29-1.25 (9H, t)

(L-1) to (L-18), (L-20) to (L-31), and (L-33) were synthesized by the method similar to the method used to synthesize compound (L-13) above. Various azo dyes suitable for use in the present invention can be similarly synthesized. The compounds were identified by 300 MHz $^1$H-NMR. A part of the NMR spectral data is given below.

(L-1) $^1$H-NMR (DMSO-d6) [ppm]; δ13.70 (1H, br), 13.31 (1H, s), 3.331 (3H, s), 1.413 (9H, s), 1.331 (9H, s)

(L-3) $^1$H-NMR (DMSO-d6) [ppm]; δ13.93 (1H, s), 10.20 (1H, s), 7.63-7.57 (2H, m), 7.06 (1H, d), 1.45 (9H, s), 1.30 (9H, s)

(L-4) $^1$H-NMR (DMSO-d6) [ppm]; δ14.68 (1H, br), 13.53 (1H, s), 8.32 (3H, s), 3.82 (2H, t), 1.53 (2H, tt), 1.31 (2H, tq), 0.90 (3H, t)

(L-5) $^1$H-NMR (DMSO-d6) [ppm]; δ13.43 (1H, br), 13.20 (1H, br), 7.40-7.36 (8H, m), 7.24-7.21 (2H, m), 1.41 (9H, s)

(L-6) $^1$H-NMR (DMSO-d6) [ppm]; δ14.20 (1H, s), 13.40 (1H, s), 3.22 (3H, s), 3.20 (3H, s), 1.42 (9H, s)

(L-8) $^1$H-NMR (DMSO-d6) [ppm]; δ13.42 (1H, br), 8.30-7.60 (4H, br), 1.40 (9H, s)

(L-10) $^1$H-NMR (DMSO-d6) [ppm]; δ13.78 (1H, s), 13.30 (1H, s), 8.38 (1H, s), 4.31 (q), 3.34 (3H, s), 1.36-1.31 (12H, m)

Specific example of method of synthesizing the azo metal complex dye of Example compound (M-13) will be given next. However, the present invention is not limited to the method.

Synthesis of (M-13)

To a 50 mL eggplant-shaped flask were charged 0.7 g of compound (L-13) and 7 mL of ethanol, and 1 mL of DBU was added dropwise while stirring. Next, 380 mg of copper acetate monohydrate was added while stirring and the mixture was hot refluxed for three hours. The mixture was returned to room temperature and 30 mL of distilled water was added to generate a precipitate. The precipitate that was obtained was filtered out, washed with distilled water, and dried, yielding 0.74 g of compound (M-13). The compound was identified by copper content measurement employing ICP-OES and by ESI-MS.

ESI-MS: m/z=1515 (nega), 785 (nega), 725 (posi)

Both the peaks of a complex comprised of four azo dyes and five copper ions and the peaks of a complex comprised of two azo dyes and two copper ions were detected in the ESI-MS results.

ICP-OES: Cu content=163±4 g/kg

The result of ICP-OES matched a structure in which two DBUs and two acetic acid ions were contained in a complex comprised of four azo dyes and five copper ions. The result indicated a higher copper content than would be the case for a complex comprised of two azo dyes and two copper ions.

(M-8), (M-11), (M-18), (M-20), (M-21), (M-26), (M-34), (M-35), and (M-38) were synthesized under the condition similar to (M-13).

(M-21): (ICP-OES) 140±5 g/kg

The result of ICP-OES matched a structure in which one DBU was contained in a complex comprised of two azo dyes and two copper ions.

(M-35): (ESI-MS) m/z=949 (nega), 920 (posi), 915 (nega)

Both the peaks of a complex comprised of four azo dyes and five copper ions and the peaks of a complex comprised of two azo dyes and two copper ions were detected in the ESI-MS results of (M-35). As stated above, (M-35) was a complex comprised of two azo dyes and two copper ions based on the results of X-ray structural analysis.

Synthesis of (M-1)

To a 50 mL eggplant-shaped flask were charged 0.7 g of compound (L-1) and 10 mL of methanol, and 1.5 mL of triethylamine was added dropwise while stirring. Next, while stirring, 430 mg of copper acetate monohydrate was added and the mixture was hot refluxed for 3 hours. The mixture was returned to room temperature. The precipitate obtained was filtered out, washed with methanol, and dried, yielding 0.44 g of compound (M-1). The compound was identified by copper content measurement employing ICP-OES, by ESI-MS, and by MALDI-MS.

ICP-OES: Cu content=172 g/kg

The result of ICP-OES matched a structure in which one triethylamine and two acetic acid ions were contained in a complex comprised of four azo dyes and five copper ions. The result indicated a higher copper content than would be the case for a complex comprised of two azo dyes and two copper ions.

ESI-MS: m/z=784 (posi), 782 (nega)

MALDI-MS: m/z=784 (posi), 782 (nega), 102 (posi)

Triethylamine and a complex comprised of two azo dyes and two copper ions were detected based on the ESI-MS and MALDI-MS results.

(M-1) to (M-6), (M-9), (M-15), and (M-28) were synthesized under the conditions similar to (M-1).

(M-9): (ESI-MS) m/z=699 (nega), 699 (posi), 670 (nega)

Both the peaks of a complex comprised of four azo dyes and five copper ions and the peaks of a complex comprised of two azo dyes and two copper ions were detected in the ESI-MS results of (M-35).

(M-16) was synthesized by replacing (L-1) with (L-16) and triethylamine with diisopropylamine and reacting them in the same manner as in the synthesis of (M-1).

(M-27) was synthesized by replacing (L-1) with (L-11) and triethylamine with diisopropylamine and reacting them in the same manner as in the synthesis of (M-1).

(M-29) was synthesized by replacing (L-1) with (L-14) and triethylamine with diisopropylamine and reacting them in the same manner as in the synthesis of (M-1).

(M-37) was synthesized by replacing (L-1) with (L-24) and triethylamine with DBN and reacting them in the same manner as in the synthesis of (M-1).

Various azo metal complex dyes suitable for use in the optical information recording medium of the present invention can be synthesized by the method similar to the methods used to synthesize the above-described compounds. The compounds can be identified by MALDI-MS, ESI-MS, ESR, ICP-OES, and X-ray structural analysis. A measurement method based on ICP-OES is given below.

<ICP-OES (ICP Optical Emission Spectrometry)

A 0.05 g sample was collected, 3 mL of nitric acid was added, and microwave ashing was conducted. The ashes were mixed with 100 mL of water and the quantity of copper was determined by the absolute calibration curve method by ICP-OES (1000-IV made by Shimadzu Corporation).

Examples 1 to 16

Preparation of Optical Information Recording Medium (Preparation of Support)

An injection molded support comprised of polycarbonate resin and having a thickness of 1.1 mm, an outer diameter of 120 mm, an inner diameter of 15 mm, and spiral pregrooves (with a track pitch of 320 nm, a groove width (at concave portion) of 170 nm, a groove depth of 37 nm, a groove tilt angle of 52°, and a wobble amplitude of 20 nm) was prepared. Mastering of the stamper employed during injection-molding was conducted by laser beam (351 nm) cutting.

(Formation of Light Reflective Layer)

An ANC (Ag: 98.1 at %, Nd: 0.7 at %, Cu: 0.9 at %) light reflective layer 60 nm in thickness was formed on the support as a vacuum-formed film layer by DC sputtering in an Ar atmosphere using a Cube manufactured by Unaxis Corp. The thickness of the light reflective film was adjusted by means of the duration of sputtering.

(Formation of Recordable Layer)

A one gram of each of compounds (M-1) to (M-6), (M-8), (M-13), (M-15), (M-16), (M-21), (M-26), (M-27), (M-28), (M-34), and (M-35) was separately added to and dissolved in 100 mL of 2,2,3,3-tetrafluoropropanol and dye-containing coating liquids were prepared as Examples 1 to 16. The dye-containing coating liquids that had been prepared were then coated on a first reflective layer 18 by spin coating while varying the rotational speed from 500 to 2,200 rpm under conditions of 23° C. and 50 percent RH to form a first recordable layer 14.

After forming the recordable layer, annealing was conducted in a clean oven. In the annealing process, the supports were supported while creating a gap with spacers in the vertical stack pole and maintained for 1 hour at 80° C.

(Formation of Barrier Layer)

Subsequently, a Cube made by Unaxis Corp. was employed to form by DC sputtering in an argon atmosphere a barrier layer comprised of $Nb_2O_5$ having a thickness of 10 nm on the recordable layer.

(Adhesion of a Cover Layer)

A cover layer in the form of a polycarbonate film (Teijin Pureace, 80 micrometers in thickness) measuring 15 mm in inner diameter, 120 mm in outer diameter, and having an adhesive layer (with a glass transition temperature of −52° C.) on one side was provided so that the combined thickness of the adhesive layer and the polycarbonate film was 100 micrometers.

After placing the cover layer on the barrier layer through the adhesive layer, a member was placed against the cover layer and pressure was applied, bonding the cover layer and barrier layer. This process yielded an optical information recording medium having the layer structure shown in FIG. 1.

The optical information recording media of Examples 1 to 16 were thus prepared.

<Measurement of the Film Thickness of the Dye Layer>

Cross-sections of the optical information recording media obtained were viewed by SEM and the thickness of the dye layer respectively at the groove concave portion and the groove convex portion were read. The groove concave portion of the dye layer was +0 to 10 nm in depth, and the groove convex portion of the dye layer was about 10 to 30 nm.

Comparative Examples 1 to 7

Preparation of Optical Information Recording Medium

With the exception that comparative compounds (A) to (G) were employed in place of compound (M-1) as dyes in the recordable recording layer, the optical information recording media of Comparative Examples 1 to 9 were prepared by the same method as in Example 1.

Comparative compound (A): compound described in Japanese Unexamined Patent Publication (KOKAI) No. 2001-158862

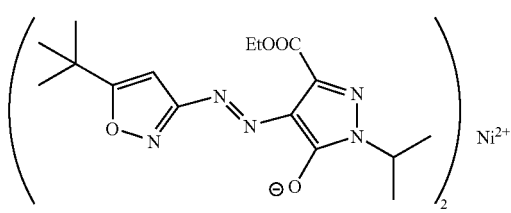

Comparative compound (B): compound described in Japanese Unexamined Patent Publication (KOKAI) No. 2001-158862

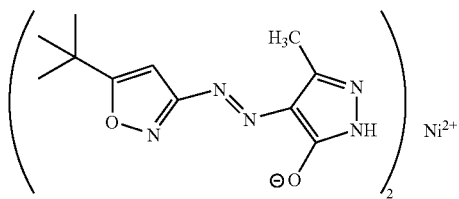

Comparative compound (C): compound within the scope described in Japanese Unexamined Patent Publication (KOKAI) No. 2006-142789

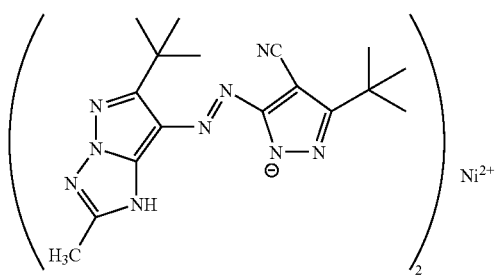

Comparative compound (D): compound described in Japanese Unexamined Patent Publication (KOKAI) No. 2006-306070

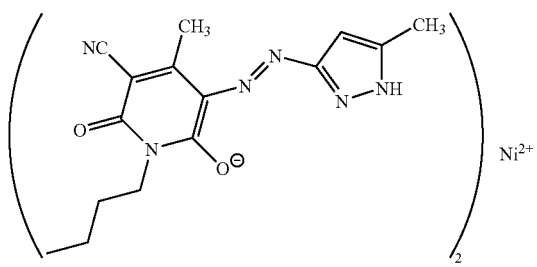

omparative compound (E): compound described in Japanese Unexamined Patent Publication (KOKAI) No. 2000-168237

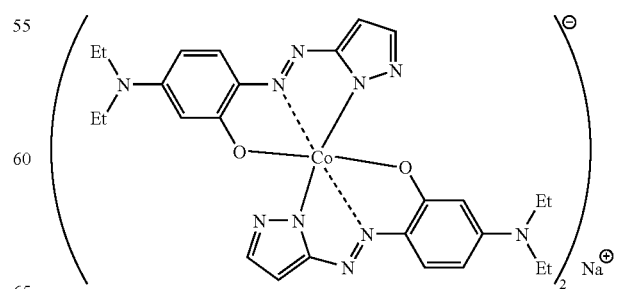

Comparative compound (F): compound described in Japanese Unexamined Patent Publication (KOKAI) No. 2006-306070

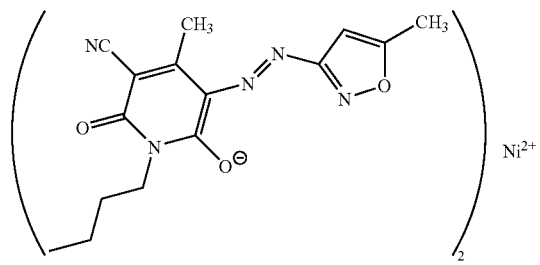

Comparative compound (G): compound described in Japanese Unexamined Patent Publication (KOKAI) No. 2007-45147

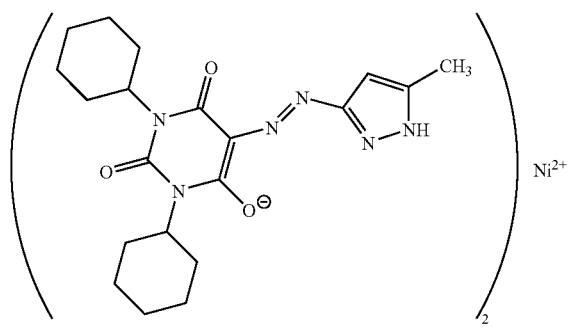

<Evaluation of the Optical Information Recording Medium>

(1) Jitter Evaluation

A (1.7) RLL-NRZI modulated mark-length modulated signal (17 PP) was recorded at a clock frequency of 66 MHz and a linear speed of 4.92 m/s by irradiation from the cover layer side with a recording and reproduction evaluation device (made by Pulstec Industrial Co., Ltd.: DDU 1000) comprising a 405 nm laser and NA 0.85 pick-ups on the optical information recording medium that had been prepared. Jitter measurement was conducted by passing the recorded signal through a limit equalizer and employing a time interval analyzer (TA520 made by Yokogawa Electric Corporation).

(2) Evaluation of the Light Resistance of the Dye Film

Dye-containing coating liquids identical to Examples 1 to 16 and Comparative Examples 1 to 7 were prepared and applied at an ordinary temperature under a nitrogen atmosphere to glass sheets 1.1 mm in thickness by spincoating while varying the rotational speed from 500 to 1,000 rpm. Subsequently, the glass sheets were maintained for 24 hours at an ordinary temperature. A merry-go-round shaped light resistance tester (Cell Tester III, made by Eagle Engineering, Inc., with WG320 filter made by Schott) was then used to conduct a light resistance test. The absorption spectra of the dye film immediately prior to the light resistance test and 48 hours after the light resistance test were measured with a UV-1600 PC (made by Shimadzu Corp.). The change in absorbance at the maximum absorption wavelength was read.

TABLE 3

| | Azo metal complex dye | Light resistance of dye film[Note 1] | Recording and reproduction characteristics[Note 2] | MALDI-MS (Cu:L) | ESI-MS (Cu:L) |
|---|---|---|---|---|---|
| Example 1 | (M-1) | ◉ | ◉ | 845(nega, 3:2), 780(nega, 2:2) 782(posi, 2:2), | 784(posi, 2:2), 782(nega, 2:2) |
| Example 2 | (M-2) | ○ | ○ | 999(nega, 3:2) | |
| Example 3 | (M-3) | ◉ | ◉ | 837(nega, 3:2), 774(nega, 2:2) | |
| Example 4 | (M-4) | ○ | ○ | 949(nega, 3:2), 884(nega, 2:2), | |
| Example 5 | (M-5) | ○ | ○ | 1041(nega, 3:2), 978(nega, 2:2), 1169(posi, 5:2) 1105(posi, 4:2), 1043(posi, 3:2), 980(posi, 2:2) | |
| Example 6 | (M-6) | ○ | ○ | | |
| Example 7 | (M-8) | ○ | ○ | 861 (posi, 2:2 + Na) | |
| Example 8 | (M-13) | ◉ | ◉ | 789(nega, 3:2) 726(nega, 2:2) | 1515(nega, 5:4), 785(nega, 3:2), 725(posi, 2:2) |
| Example 9 | (M-15) | ◉ | ◉ | 817(nega, 3:2) 752(nega, 2:2) | |
| Example 10 | (M-16) | ◉ | ◉ | 947(posi, 5:2) 885(posi, 4:2) 823(posi, 3:2) 758(posi, 2:2) | |
| Example 11 | (M-21) | ◉ | ◉ | 845(nega, 3:2), 780(nega, 2:2) 782(posi, 2:2), | 784(posi, 2:2), 782(nega, 2:2) |
| Example 12 | (M-26) | ◉ | ◉ | 733(nega, 3:2) 668(nega, 2:2) | |

TABLE 3-continued

|  | Azo metal complex dye | Light resistance of dye film(Note 1) | Recording and reproduction characteristics(Note 2) | MALDI-MS (Cu:L) | ESI-MS (Cu:L) |
|---|---|---|---|---|---|
| Example 13 | (M-27) | ◎ | ◎ | 948(posi, 4:2) 887(posi, 3:2) 823(posi, 2:2) 885(posi, 3:2) 820(nega, 2:2) | |
| Example 14 | (M-28) | ◎ | ◎ | 817(nega, 3:2) 752(nega, 2:2) | |
| Example 15 | (M-34) | ◎ | ◎ | | |
| Example 16 | (M-35) | ◎ | ○ | 983(posi, 3:2) | 949(nega, 5:4), 920(posi, 2:2), 915(nega, 2:2) |
| Comp. Ex. 1 | Compound (A) | Δ | X | — | — |
| Comp. Ex. 2 | Compound (B) | X | X(Note 3) | — | — |
| Comp. Ex. 3 | Compound (C) | Δ | X | — | — |
| Comp. Ex. 4 | Compound (D) | — (undissolved) | X(Note 3) | — | — |
| Comp. Ex. 5 | Compound (E) | Δ | X | — | — |
| Comp. Ex. 6 | Compound (F) | X | ○ | — | — |
| Comp. Ex. 7 | Compound (G) | Δ | X | — | — |

(Note 1) After 48 hours of irradiation by Xe lamp, a dye remaining rate at absorption λmax of equal to or greater than 90 percent was denoted by ◎, equal to or greater than 85 percent but less than 90 percent by ○, equal to or greater than 75 percent but less than 85 percent by Δ, and less than 75 percent by X.
(Note 2) A jitter of less than 7 percent was denoted by ◎, equal to or greater than 7 percent but less than 8 percent by ○, and equal to or greater than 8 percent by X.
(Note 3) Due to poor solubility and the inability to form an adequate recording layer, recording or measurement was precluded.

As shown in Table 3, in contrast to Comparative Examples 1 to 7, in which conventional azo metal complexes were employed, each of Examples 1 to 16 achieved both light resistance and recording and reproduction characteristics, and exhibited good characteristics as dyes for Blu-ray discs. Compared to the Ni ions and Co ions that have been desirably employed in azo metal complexes as metal ions thus far, the azo metal complex dye of the present invention, which contained Cu ions, exhibited better light resistance and better recording and reproduction characteristics. In all of Examples, recording and reproduction of the optical information recording medium were possible following 55 hours of irradiation with Xe light, and the light resistance in the optical information recording medium was good.

The azo metal complex dye employed in Examples afforded good solubility in the coating solvent as well as good film stability. The optical information recording medium prepared in Example 1 was stored for 168 hours at high temperature and high humidity following recording, but almost no jitter change was observed; storage stability at high temperature and high humidity was found to be extremely good.

In contrast to Comparative compounds (A) to (D) and (F), the absorption spectra of which changed greatly and which exhibited poor compound stability after being stored in coating solvent (25° C.), Example compounds (M-2), (M-8), (M-11), (M-13), (M-15), (M-16), (M-21), (M-26), (M-27), (M-29), (M-34), and (M-35) exhibited little change in absorption spectra and good stability under identical conditions.

When (M-1) and (M-15) dye films prepared in the same manner as in the light resistance evaluation were stored for 24 hours at 60° C. and 90 percent RH, they exhibited almost no absorption change and afforded good stability at high temperature and high humidity.

The optical information recording medium and azo metal complex dye according to the present invention are not limited to the above-described modes of implementation; various configurational modification is possible without departing from the scope or spirit of the present invention. It is revealed that the azo metal complex dyes according to the present invention have desirable properties for various uses such as photographic materials, color filter dyes, color-changing filters, thermal transfer recording materials, ink, and the like because they are excellent in light resistance and stability at high temperature and high humidity.

The use of the azo metal complex dye of the present invention as a recording layer dye permits the manufacturing of an optical information recording medium of good recording and reproduction characteristics as well as extremely high light resistance (particularly an optical information recording medium permitting recording of information by irradiation with a laser beam with a wavelength of equal to or shorter than 440 nm).

The azo metal complex dye of the present invention can also be applied to photographic materials, color filter dyes, color-changing filters, thermal transfer recording materials, ink, and the like.

Although the present invention has been described in considerable detail with regard to certain versions thereof, other versions are possible, and alterations, permutations and equivalents of the version shown will become apparent to those skilled in the art upon a reading of the specification and study of the drawings. Also, the various features of the versions herein can be combined in various ways to provide additional versions of the present invention. Furthermore, certain terminology has been used for the purposes of descriptive clarity, and not to limit the present invention. Therefore, any appended claims should not be limited to the description of the preferred versions contained herein and should include all such alterations, permutations, and equivalents as fall within the true spirit and scope of the present invention.

Having now fully described this invention, it will be understood to those of ordinary skill in the art that the methods of the present invention can be carried out with a wide and equivalent range of conditions, formulations, and other parameters without departing from the scope of the invention or any embodiments thereof.

All patents and publications cited herein are hereby fully incorporated by reference in their entirety. The citation of any publication is for its disclosure prior to the filing date and should not be construed as an admission that such publication is prior art or that the present invention is not entitled to antedate such publication by virtue of prior invention.

Unless otherwise stated, a reference to a compound or component includes the compound or component by itself, as well as in combination with other compounds or components, such as mixtures of compounds.

As used herein, the singular forms "a," "an," and "the" include the plural reference unless the context clearly dictates otherwise.

Except where otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not to be considered as an attempt to limit the application of the doctrine of equivalents to the scope of the claims, each numerical parameter should be construed in light of the number of significant digits and ordinary rounding conventions.

Additionally, the recitation of numerical ranges within this specification is considered to be a disclosure of all numerical values and ranges within that range. For example, if a range is from about 1 to about 50, it is deemed to include, for example, 1, 7, 34, 46.1, 23.7, or any other value or range within the range.

What is claimed is:

1. An optical information recording medium comprising a recording layer on a surface of a support, wherein:
   the surface of the support has pregrooves with a track pitch ranging from 50 to 500 nm,
   the recording layer comprises an azo metal complex dye,
   the azo metal complex dye is a complex of one or more azo dye and transition metal ions of which the number of transition metal ions is equal to or greater than the number of the azo dye, the azo metal complex dye comprising two or more transition metal ions per molecule, and in a molecule of the azo metal complex dye, the transition metal ions present may be identical or different from each other and plural azo dyes may be identical or different from each other when plural azo dyes are present in a molecule of the azo metal complex dye;
   provided that azo dyes having the partial structures (1-1) or (1-2) below are excluded:

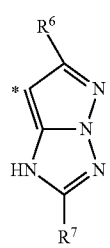

(1-1)

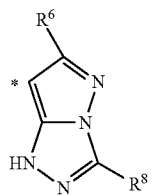

(1-2)

in the above, $R^6$, $R^7$ and $R^8$ each independently denotes a hydrogen atom or a substituent, and * denotes a binding position with an —N=N— group;

and further wherein:

the transition metal ion is a copper ion; and the azo metal complex dye exhibits a result indicating that two azo dyes and two transition metal copper ions are comprised per molecule by at least one analysis selected from the group consisting of ESI-MS, MALDI-MS, and X-ray structural analysis.

2. The optical information recording medium according to claim 1, wherein the azo dye comprises a partial structure denoted by general formula (A):

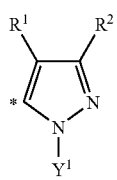

General formula (A)

in general formula (A), $R^1$ and $R^2$ each independently denotes a hydrogen atom or a substituent, $Y^1$ denotes a hydrogen atom that may be dissociated from the partial structure denoted by general formula (A) in the recording layer, and * denotes a binding position with an —N=N— group.

3. The optical information recording medium according to claim 2, wherein the azo dye is an azo dye denoted by general formula (1):

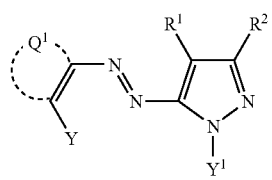

General formula (1)

in general formula (1), $Q^1$ denotes an atom group forming a heterocyclic ring or a carbon ring, Y denotes a group comprising a hydrogen atom that may be dissociated from the azo dye denoted by general formula (1) in the recording layer, and $R^1$, $R^2$, and $Y^1$ are defined respectively as in general formula (A).

4. The optical information recording medium according to claim 3, wherein the azo metal complex dye is one obtained by reaction of the azo dye denoted by general formula (1) with transition metal ions in the presence of a base.

5. The optical information recording medium according to claim 3, wherein the following partial structure:

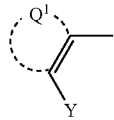

denotes the following partial structural formula (E-1) to (E-6) or (E-8):

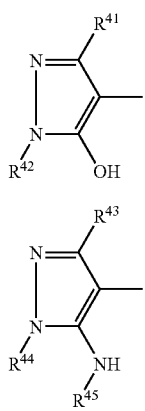
(E-1)

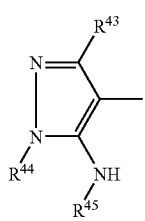
(E-2)

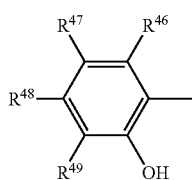
(E-3)

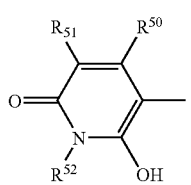
(E-4)

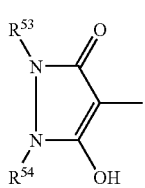
(E-5)

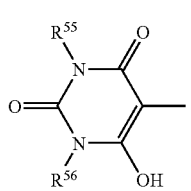
(E-6)

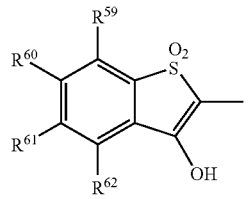
(E-8)

in the above, $R^{41}$ to $R^{56}$ and $R^{59}$ to $R^{62}$ each independently denotes a hydrogen atom or a substituent, the subsubstituent may bond with an adjacent substituent to form a ring, and when $R^{46}$ to $R^{49}$ each independently denotes a substituent, the substituent is a substituent other than an amino group, a hydroxyl group, an alkoxy group, and an aryloxy group.

6. The optical information recording medium according to claim 2, wherein $R^1$ denotes a substituted or unsubstituted alkyloxycarbonyl group having 2 to 10 carbon atoms or a cyano group.

7. The optical information recording medium according to claim 3, wherein $R^1$ denotes a substituted or unsubstituted alkyloxycarbonyl group having 2 to 10 carbon atoms or a cyano group.

8. The optical information recording medium according to claim 1, wherein the recording layer comprises a base.

9. The optical information recording medium according to claim 1, wherein information is recorded by irradiation of a laser beam having a wavelength of equal to or shorter than 440 nm.

10. The optical information recording medium according to claim 9, further comprising a reflective layer between the support and the recording layer, wherein the laser beam is irradiated onto the recording layer from an opposite surface side, the opposite surface being opposite from the surface facing the reflective layer.

11. A method of recording information on the optical information recording medium according to claim 1 by irradiation of a laser beam having a wavelength of equal to or shorter than 440 nm onto the recording layer comprised in the optical information recording medium.

12. An optical information recording medium comprising a recording layer on a surface of a support, wherein:

the surface of the support has pregrooves with a track pitch ranging from 50 to 500 nm, the recording layer comprises an azo metal complex dye, the azo metal complex dye is a complex of one or more azo dye and transition metal ions of which the number of transition metal ions is equal to or greater than the number of the azo dye, the azo metal complex dye comprising two or more transition metal ions per molecule, and in a molecule of the azo metal complex dye, the transition metal ions present may be identical or different from each other and plural azo dyes may be identical or different from each other when plural azo dyes are present in a molecule of the azo metal complex dye;

provided that azo dyes having the partial structures (1-1) or (1-2) below are excluded:

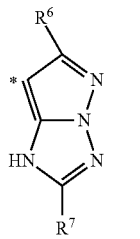
(1-1)

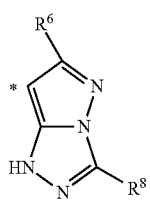
(1-2)

in the above, $R^6$, $R^7$ and $R^8$ each independently denotes a hydrogen atom or a substituent, and * denotes a binding position with an —N=N— group;
and further wherein:
the azo metal complex dye exhibits a result indicating that four azo dyes and five transition metal ions are comprised per molecule by at least one analysis selected from the group consisting of ESI-MS, MALDI-MS, and X-ray structural analysis.

13. The optical information recording medium according to claim 12, wherein the transition metal ion is a copper ion.

14. A method of recording information on the optical information recording medium according to claim 12 by irradiation of a laser beam having a wavelength of equal to or shorter than 440 nm onto the recording layer comprised in the optical information recording medium.

15. An azo metal complex dye denoted by general formula (F) or (H):

$$[(Cu)_5(L^{2-})_4(L')x] \cdot G_v \qquad \text{General Formula (F)}$$

in general formula (F), $L^{2-}$ denotes a divalent anion in which two hydrogen atoms have been dissociated from the azo dye denoted by general formula (2), G denotes an ion necessary for neutralizing a charge, v denotes an integer ranging from 0 to 2, L' denotes a ligand, and x denotes an integer ranging from 0 to 6;

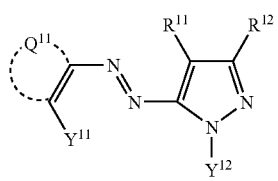
General formula (2)

in general formula (2), $Y^{11}$ denotes a group comprising one of the two hydrogen atoms, $Y^{12}$ denotes the other hydrogen atom of the above two hydrogen atoms, $R^{11}$ denotes a substituted or unsubstituted alkyloxycarbonyl group having 2 to 10 carbon atoms or a cyano group, $R^{12}$ denotes a hydrogen atom or a substituent, and the following partial structure:

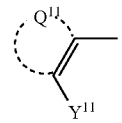

denotes the following partial structural formula (E-1) to (E-6) or (E-8):

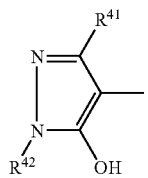
(E-1)

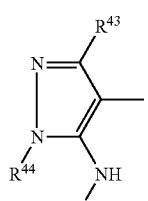
(E-2)

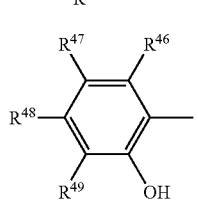
(E-3)

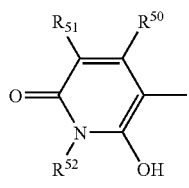
(E-4)

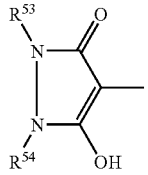
(E-5)

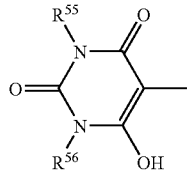
(E-6)

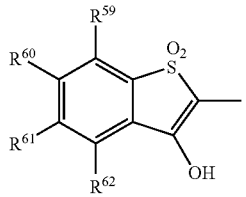
(E-8)

in the above, $R^{41}$ to $R^{56}$ and $R^{59}$ to $R^{62}$ each independently denotes a hydrogen atom or a substituent, the subsubstituent may bond with an adjacent substituent to form a ring, and when $R^{46}$ to $R^{49}$ each independently denotes a substituent, the substituent is a substituent other than an amino group, a hydroxyl group, an alkoxy group, and an aryloxy group;

General formula (H)

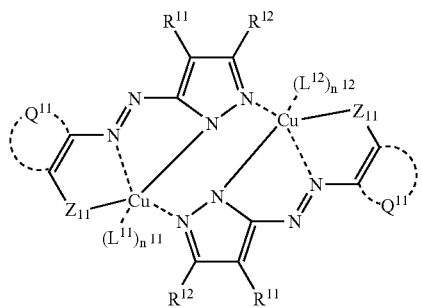

in general formula (H), $R^{11}$ and $R^{12}$ are defined respectively as in general formula (2) and $Z^{11}$ denotes a group in which a hydrogen atom has been dissociated from $Y^{11}$ in the following partial structure:

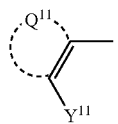

the above partial structure relative to general formula (H) denotes (E-1), (E-2), (E-5), (E-6), or (E-8) as defined in general formula (2); in general formula (H), two $Q^{11}$s, two $Z^{11}$s, two $R^{11}$s, and two $R^{12}$s present may be respectively identical or different from each other, $L^{11}$ and $L^{12}$ each independently denotes a ligand, $n^{11}$ and $n^{12}$ each independently denotes an integer ranging from 0 to 2, when plural $L^{11}$s are present, the plural $L^{11}$s may be identical or different from each other, and when plural $L^{12}$s are present, the plural $L^{12}$s may be identical or different from each other, provided that azo dyes having the partial structures (1-1) or (1-2) below are excluded from the azo metal complex dye denoted by general formula (F) or (H):

(1-1)

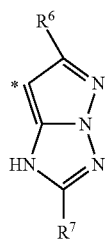

(1-2)

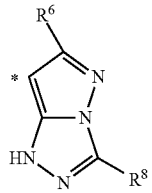

in the above, $R^6$, $R^7$ and $R^8$ each independently denotes a hydrogen atom or a substituent, and * denotes a binding position with an —N=N— group.

* * * * *